US011353638B2

(12) United States Patent
Onishi

(10) Patent No.: US 11,353,638 B2
(45) Date of Patent: Jun. 7, 2022

(54) OPTICAL UNIT AND PROJECTION DEVICE

(71) Applicant: Panasonic Intellectual Property Management Co., Ltd., Osaka (JP)

(72) Inventor: Hideo Onishi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/125,119

(22) Filed: Dec. 17, 2020

(65) Prior Publication Data

US 2021/0103077 A1 Apr. 8, 2021

Related U.S. Application Data

(63) Continuation of application No. PCT/JP2019/038519, filed on Sep. 30, 2019.

(30) Foreign Application Priority Data

Nov. 1, 2018 (JP) .............................. JP2018-206838

(51) Int. Cl.
*H04N 9/31* (2006.01)
*G02B 5/04* (2006.01)
*G02B 26/08* (2006.01)

(52) U.S. Cl.
CPC ......... *G02B 5/045* (2013.01); *G02B 26/0833* (2013.01); *H04N 9/3105* (2013.01)

(58) Field of Classification Search
CPC .... H04N 9/315; H04N 9/3102; H04N 9/3105; H04N 9/3141; H04N 9/3152;
(Continued)

(56) References Cited

U.S. PATENT DOCUMENTS 9,877,001 B2 1/2018 Terada
2004/0008402 A1* 1/2004 Patel .................. G02B 26/0841
359/291

(Continued)

FOREIGN PATENT DOCUMENTS

| WO | 2015/194454 | 12/2015 |
| WO | 2017/130924 | 8/2017 |
| WO | 2018/138986 | 8/2018 |

OTHER PUBLICATIONS

International Preliminary Report on Patentability dated Apr. 27, 2021 in International (PCT) Patent Application No. PCT/JP2019/038519.

(Continued)

*Primary Examiner* — Sultan Chowdhury
(74) *Attorney, Agent, or Firm* — Wenderoth, Lind & Ponack, L.L.P.

(57) ABSTRACT

An optical unit includes first to third prisms. The first prism has a first coated surface configured to reflect illumination light in a first wavelength band, a first surface, and a first light transmitting surface. The second prism has a second coated surface configured to reflect the illumination light in a second wavelength band, a second surface, and a second light transmitting surface. The third prism has a third light transmitting surface, and a fourth light transmitting surface. The first prism is formed with normal lines of the first coated surface, the first surface, and the first light transmitting surface being out of coplanar with each other, and/or the second prism is formed with normal lines of the second coated surface, the second surface, and the second light transmitting surface being out of coplanar with each other.

10 Claims, 19 Drawing Sheets

(58) Field of Classification Search
CPC .. H04N 9/3158; H04N 9/3161; H04N 9/3164; G02B 5/045; G02B 5/04; G02B 5/08; G02B 5/0816; G02B 5/0825; G02B 5/0858; G02B 5/0875; G02B 5/12; G02B 5/136; G02B 26/0816; G02B 26/0833; G02B 26/0841; G02B 26/0883
See application file for complete search history.

(56) References Cited

U.S. PATENT DOCUMENTS

| | | | |
|---|---|---|---|
| 2006/0044521 A1 | 3/2006 | Vandorpe et al. | |
| 2007/0058143 A1* | 3/2007 | Penn | H04N 9/3114 353/102 |
| 2016/0085081 A1* | 3/2016 | Teramoto | G03B 33/12 353/33 |
| 2016/0119595 A1* | 4/2016 | Lyubarsky | G02B 27/145 353/20 |
| 2016/0363851 A1 | 12/2016 | Takahara et al. | |
| 2017/0142378 A1 | 5/2017 | Terada | |
| 2017/0285453 A1* | 10/2017 | Morant | G02B 27/0101 |
| 2020/0103740 A1 | 4/2020 | Oonishi et al. | |

OTHER PUBLICATIONS

International Search Report dated Dec. 17, 2020 in International (PCT) Application No. PCT/JP2019/038519.
Extended European Search Report dated Dec. 6, 2021 in corresponding European Patent Application No. 19879591.6.

* cited by examiner (A)

(B)

(C)

(A) ON STATE (B) OFF STATE

OPTICAL UNIT AND PROJECTION DEVICE

BACKGROUND

1. Technical Field

The present disclosure relates to an optical unit and a projection device including the optical unit.

2. Related Art

WO 2015/194454 A discloses a image projection optical unit including a new operation type digital micro mirror device that drives micro mirrors with respect to two axes. In the image projection optical unit, the digital micro mirror device modulates intensity of incident illumination light to form an image. Among the intensity-modulated light, ON light reflected by the micro mirror in an ON state is emitted through a prism optical system of the image projection optical unit. WO 2015/194454 A aims to prevent temperature rise and stray light due to OFF light by appropriately spatially separating ON light necessary for image projection and OFF light unnecessary for image projection.

SUMMARY

An object of the present disclosure is to provide an optical unit and a projection device that can reduce a light loss from illumination light.

An optical unit of the present disclosure includes a first prism, a second prism, and a third prism. The first prism has a first coated surface configured to reflect illumination light in a first wavelength band, a first surface configured to transmit the illumination light to guide the illumination light to the first coated surface and configured to reflect the illumination light reflected by the first coated surface, and a first light transmitting surface configured to transmit the illumination light reflected by the first surface. The second prism has a second coated surface configured to reflect the illumination light in a second wavelength band, a second surface configured to transmit the illumination light transmitted from the first coated surface to guide the illumination light to the second coated surface and configured to reflect the illumination light reflected by the second coated surface, and a second light transmitting surface configured to transmit the illumination light reflected by the second surface. The third prism has a third light transmitting surface configured to transmit the illumination light transmitted from the first and second coated surfaces, and a fourth light transmitting surface configured to transmit the illumination light transmitted from the third light transmitting surface. The first prism is formed with normal lines of the first coated surface, the first surface, and the first light transmitting surface being out of coplanar with each other, and/or the second prism is formed with normal lines of the second coated surface, the second surface, and the second light transmitting surface being out of coplanar with each other.

A projection device of the present disclosure includes the optical unit and a projection light source configured to supply illumination light incident on the optical unit.

The optical unit and the projection device of the present disclosure can reduce a light loss from the illumination light.

DESCRIPTION OF EMBODIMENTS

Hereinafter, embodiments will be described in detail with reference to the drawings as appropriate. However, unnecessarily detailed description may be omitted. For example, detailed description of well-known matters and duplicate description of substantially the same configuration may be omitted. This is to avoid unnecessary redundancy in the following description and to facilitate understanding by those skilled in the art.

It should be noted that the accompanying drawings and the following description are provided by the applicant for those skilled in the art to fully understand the present disclosure, and are not intended to limit the subject matter described in the claims.

First Embodiment

Hereinafter, a projection device and an optical unit according to a first embodiment of the present disclosure will be described with reference to the drawings.

1. Configuration 1-1. Projection Device

Figure 1:
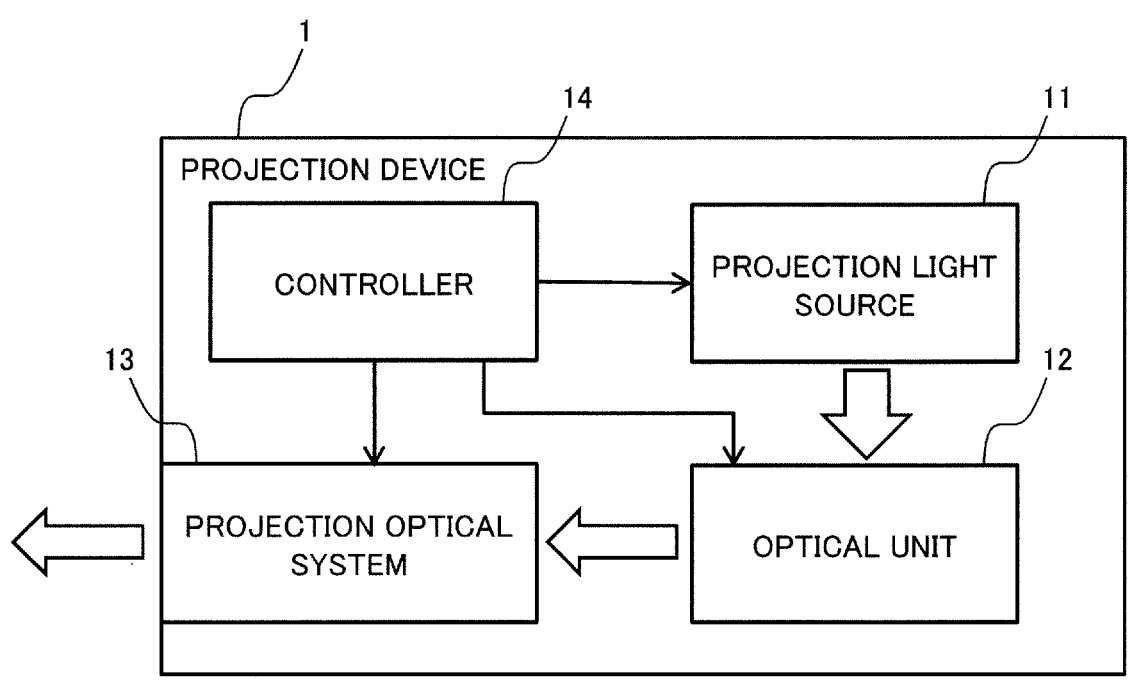
FIG. 1 is a diagram showing a configuration of a projection device according to a first embodiment of the present disclosure.

The projection device according to the first embodiment will be described with reference to FIG. 1. FIG. 1 is a diagram showing a configuration of a projection device 1 according to the present embodiment.

As shown in FIG. 1, the projection device 1 according to the present embodiment includes a projection light source 11, an optical unit 12, a projection optical system 13, and a controller 14. The projection device 1 is a three-plate DLP projector using three digital mirror devices (DMDs), for example. The projection device 1 projects various projection images on an external screen or the like.

The projection light source 11 includes a light source device such as a white LED, and generates white illumination light. Illumination light from the projection light source 11 is supplied to the optical unit 12. The light source device of the projection light source 11 may be another LED, a laser light source such as a semiconductor laser, or various light source devices such as a halogen lamp. Further, the projection light source 11 may include various wavelength conversion elements such as phosphors.

The optical unit 12 according to the present embodiment includes a Tilt and Roll Pixel (TRP) DMD and a prism optical system. The optical unit 12 is a device in which optical elements are modularized to allow illumination light to enter the projection device 1, for example. The optical unit 12 according to the present embodiment performs color separation, spatial light modulation, and color synthesis for three colors on the illumination light from the projection light source 11 to generate light indicating a projection image. Details of the optical unit 12 and the TRP DMD will be described later.

The projection optical system 13 includes a plurality of lens elements, a diaphragm, and the like. The projection optical system 13 takes in light indicating a projection image from the optical unit 12 and emits the light to the outside of the projection device 1. The projection optical system 13 may configure a zoom lens that controls an angle of view of the projection device 1, a focus lens that adjusts a focus, and the like. The projection device 1 may appropriately include various optical systems that guide light between the projection light source 11 and the optical unit 12 or between the optical unit 12 and the projection optical system 13.

The controller 14 controls a whole operation of the projection device 1. The controller 14 includes, for example, a CPU, a ROM, a RAM, and the like, and performs various arithmetic processes to provide various functions. For example, the controller 14 controls light emission of the projection light source 11 and supplies a control signal indicating a projection image to the DMD of the optical unit 12. The controller 14 may perform zoom control, focus control, and the like. The controller 14 may be configured by various semiconductor integrated circuits such as a microcomputer, DSP, FPGA, and ASIC.

1-2. Configuration of Optical Unit

Figure 3:
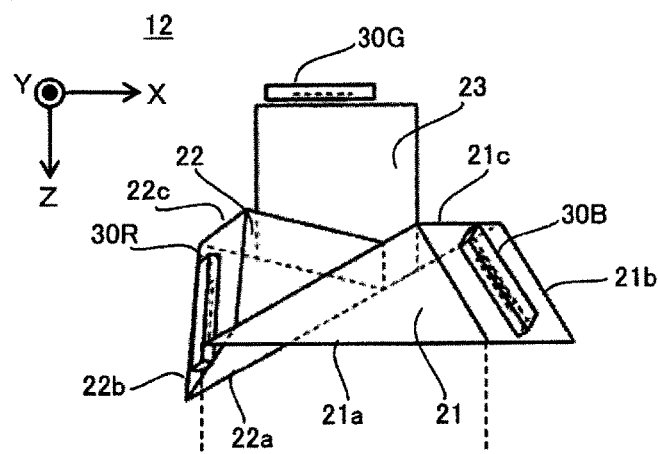
FIGS. 3(A)-(C) are trihedral views showing a configuration of the optical unit according to the first embodiment.
Figure 3:
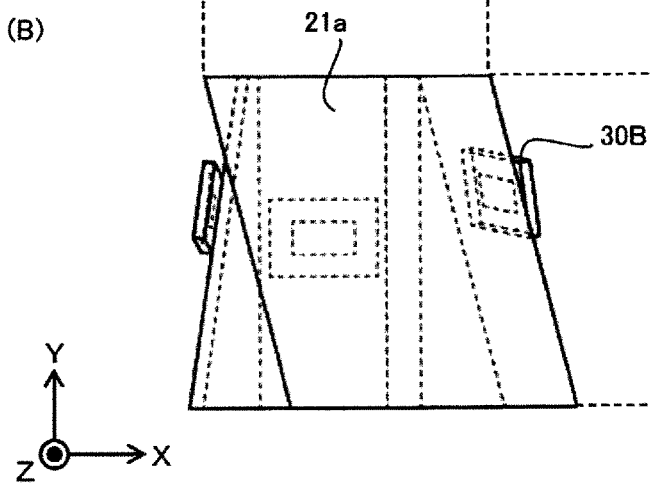
Figure 3:
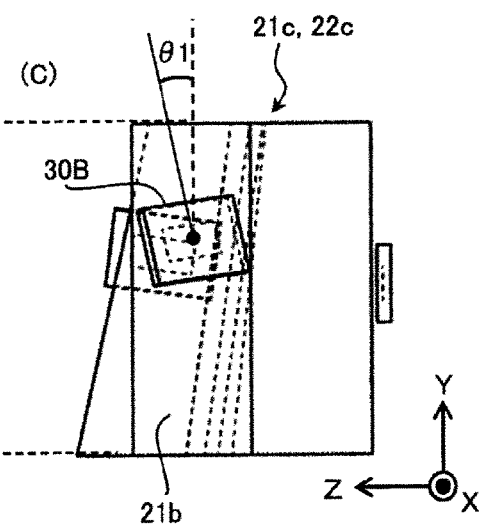
Figure 4:
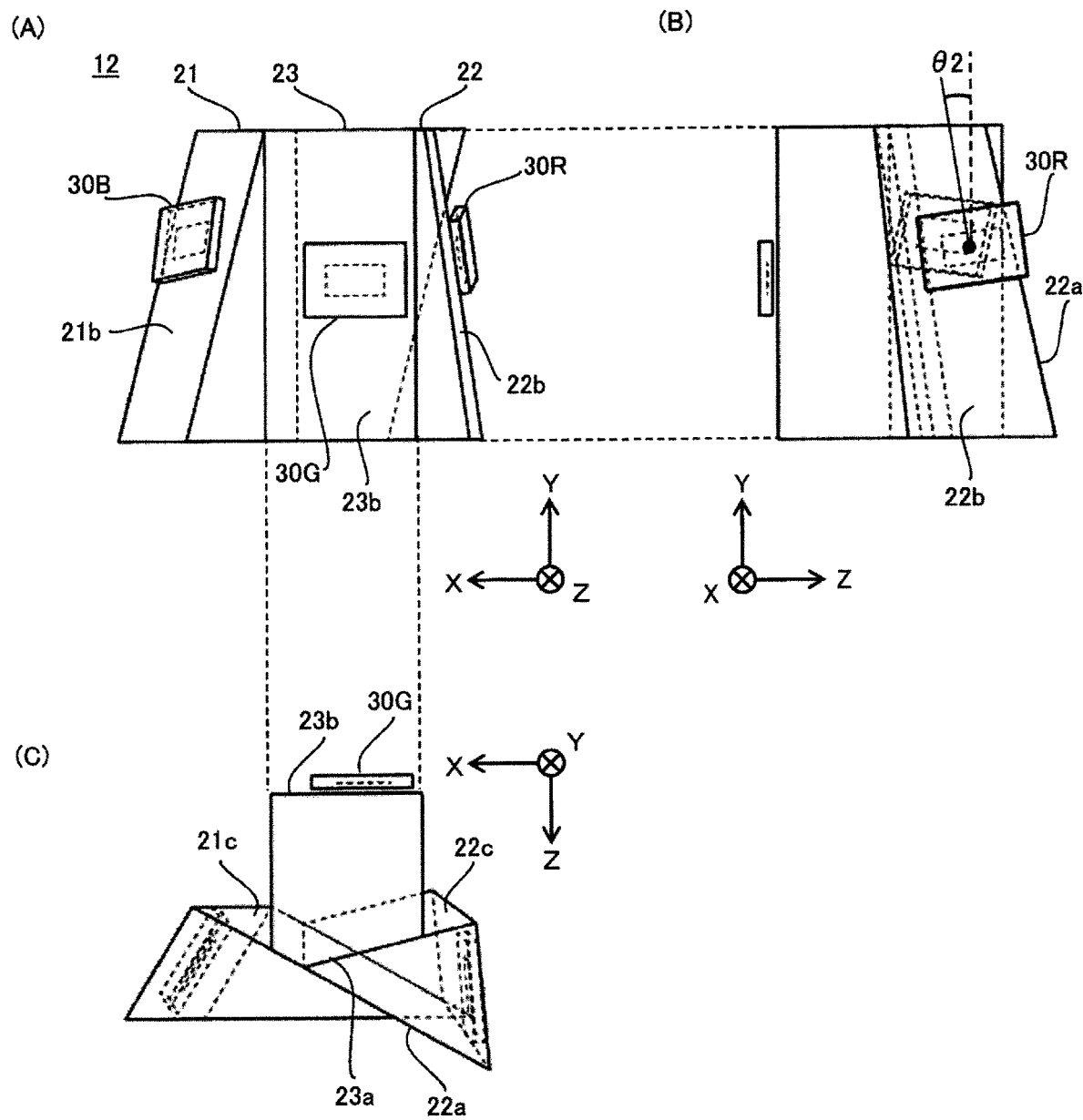
FIGS. 4(A)-(C) are trihedral views of the optical unit opposite to that in FIG. 3.

Details of a configuration of the optical unit 12 according to the first embodiment will be described with reference to FIGS. 2 to 4.

Figure 2:
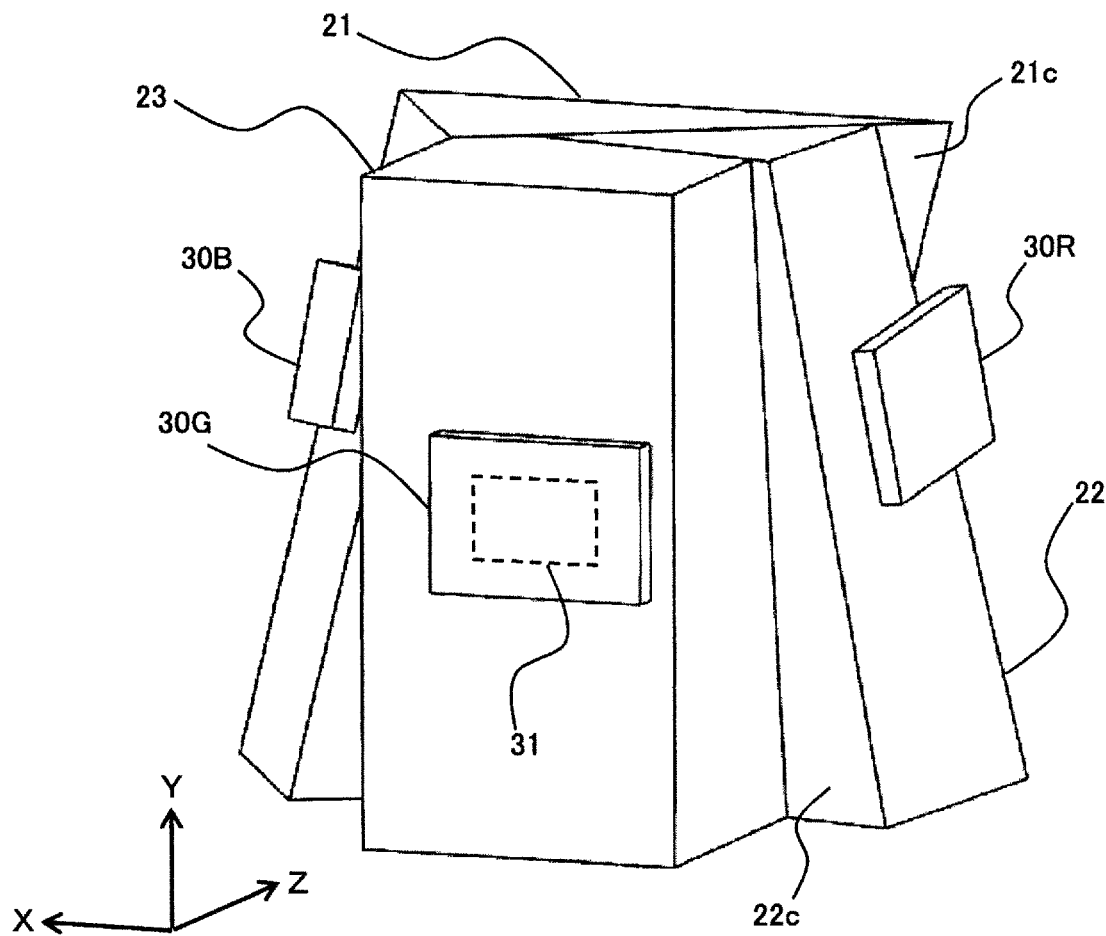
FIG. 2 is a perspective view showing an appearance of an optical unit according to the first embodiment.

FIG. 2 is a perspective view showing an appearance of the optical unit 12 according to the present embodiment. FIG. 3 is a trihedral view showing the configuration of the optical unit 12. FIG. 4 is a trihedral view of the optical unit 12 opposite to that in FIG. 3.

The optical unit 12 according to the present embodiment includes three prisms 21, 22, and 23, which configure a prism optical system, and three DMDs 30B, 30R, and 30G. Hereinafter, the DMD 30B for blue, the DMD 30R for red, and the DMD 30G for green are generically referred to as "DMD 30". The DMD 30 has a spatial light modulation surface 31 on which TRP pixels are arranged in a matrix. A horizontal direction and a vertical direction are defined as two directions in which pixels are arranged orthogonally to each other on the spatial light modulation surface 31. Hereinafter, in the DMD 30G for green, the horizontal direction on the spatial light modulation surface 31 is an X direction, the vertical direction is a Y direction, and a normal direction is a Z direction.

FIG. 3(A) is a plan view of the optical unit 12 viewed from a +Y side. FIG. 3(B) is a front view of the optical unit 12 viewed from a +Z side. FIG. 3(C) is a right side view of the optical unit 12 viewed from a +X side. The +X side may be referred to as a right side, and a −X side may be referred to as a left side. The +Y side may be referred to as an upper side, a −Y side as a lower side, the +Z side as a front side, and a −Z side as a rear side.

In the optical unit 12, a blue prism 21, a red prism 22, and a green prism 23 are arranged in order from the front side in the Z direction. In the X direction, the blue prism 21 is located on the right side, the red prism 22 is located on the left side, and the green prism 23 is located between the blue prism 21 and the red prism 22. Each of the prisms 21 to 23 extends in the Y direction. Each of the prisms 21 to 23 is configured by a light-transmissive material such as glass or transparent resin through which light transmits.

The blue prism 21 is provided with a blue reflecting surface 21c by applying dichroic coating to a surface on the −Z side, for example. The blue reflecting surface 21c has optical characteristics of reflecting a component of incident light within a range of a first wavelength band which includes such as a wavelength of 480 nm or less as blue light and transmitting the remaining components. The blue reflecting surface 21c is an example of a first coated surface in the present embodiment.

The red prism 22 is provided with a red reflecting surface 22c by applying dichroic coating to a surface on the −Z side, for example. The red reflecting surface 22c has optical characteristics of reflecting a component of incident light within a range of a second wavelength band which includes such as a wavelength of 610 nm or more as red light and transmitting the remaining components. The red reflecting surface 22c is an example of a second coated surface in the present embodiment.

As shown in FIG. 3(A), the blue reflecting surface 21c is directed from the right rear to the left front on an XZ plane. On the other hand, the red reflecting surface 22c is directed from the left rear to the right front. In the optical unit 12 according to the present embodiment, both the blue reflecting surface 21c and the red reflecting surface 22c are inclined forward as going downward in the Y direction, as shown in FIGS. 3(A) and 3(C).

As shown in FIGS. 3(A) to 3(C), the blue prism 21 has a substantially triangular prism-shaped outer shape, for example. In the present embodiment, a front surface of the blue prism 21, that is, a front surface 21a is parallel to an XY plane. The front surface 21a of the blue prism 21 is an example of a first surface in the present embodiment.

The DMD 30B for blue is disposed along a right side surface 21b of the blue prism 21. The side surface 21b is directed from the rear left to the front right on the XZ plane, and is inclined toward the right as going downward in the Y direction. As shown in FIG. 3(C), the DMD 30B for blue is disposed on the side surface 21b in a direction rotated counterclockwise by a predetermined angle θ1. The angle θ1 is set in accordance with the optical path of light entering and emitting the DMD 30B for blue. The DMD 30B for blue is an example of a first spatial light modulator. The side surface 21b is an example of a first light transmitting surface in the present embodiment.

FIG. 4(A) is a rear view of the optical unit 12 viewed from the −Z side. FIG. 4(B) is a left side view of the optical unit 12 viewed from the −X side. FIG. 4(C) is a bottom view of the optical unit 12 viewed from the −Y side.

As shown in FIGS. 4(A) to 4(C), the red prism 22 has a substantially triangular prism-shaped outer shape, for example. In the present embodiment, a front surface 22a of the red prism 22 is adjacent to the blue reflecting surface 21c of the blue prism 21 in parallel. The front surface 22a of the red prism 22 is an example of a second surface in the present embodiment.

The DMD 30R for red is disposed along a side surface 22b on the −X side (i.e., the left side) of the red prism 22. As shown in FIG. 4(A), the side surface 22b of the red prism 22 is inclined to an opposite side to the side surface 21b of the blue prism 21 in the Y direction. As shown in FIG. 4(B), the DMD 30R for red is disposed on the side surface 22b of the red prism 22 in a direction rotated counterclockwise by a predetermined angle θ2. The angle θ2 is set in accordance with the optical path of the light entering and emitting the DMD 30R for red. The DMD 30R for red is an example of a second spatial light modulator. The side surface 22b is an example of a second light transmitting surface in the present embodiment.

As shown in FIGS. 4(A) to 4(C), the green prism 23 in the present embodiment has a substantially pentagonal columnar outer shape, for example. A front surface 23a of the green prism 23 is bent to include a portion adjacent to the blue reflecting surface 21c of the blue prism 21 in parallel on the +X side, and a portion adjacent to the red reflecting surface 22c of the red prism 22 in parallel on the −X side. The front surface 23a of the green prism 23 is an example of a third light transmitting surface in the present embodiment.

The DMD 30G for green is disposed along a rear side surface 23b of the green prism 23. The side surface 23b has a width direction parallel to the X direction of the DMD 30G for green, a height direction parallel to the Y direction, and a normal direction parallel to the Z direction, for example. The side surface 23b is an example of a fourth light transmitting surface in the present embodiment. The DMD 30G for green is an example of a third spatial light modulator.

Figure 5:
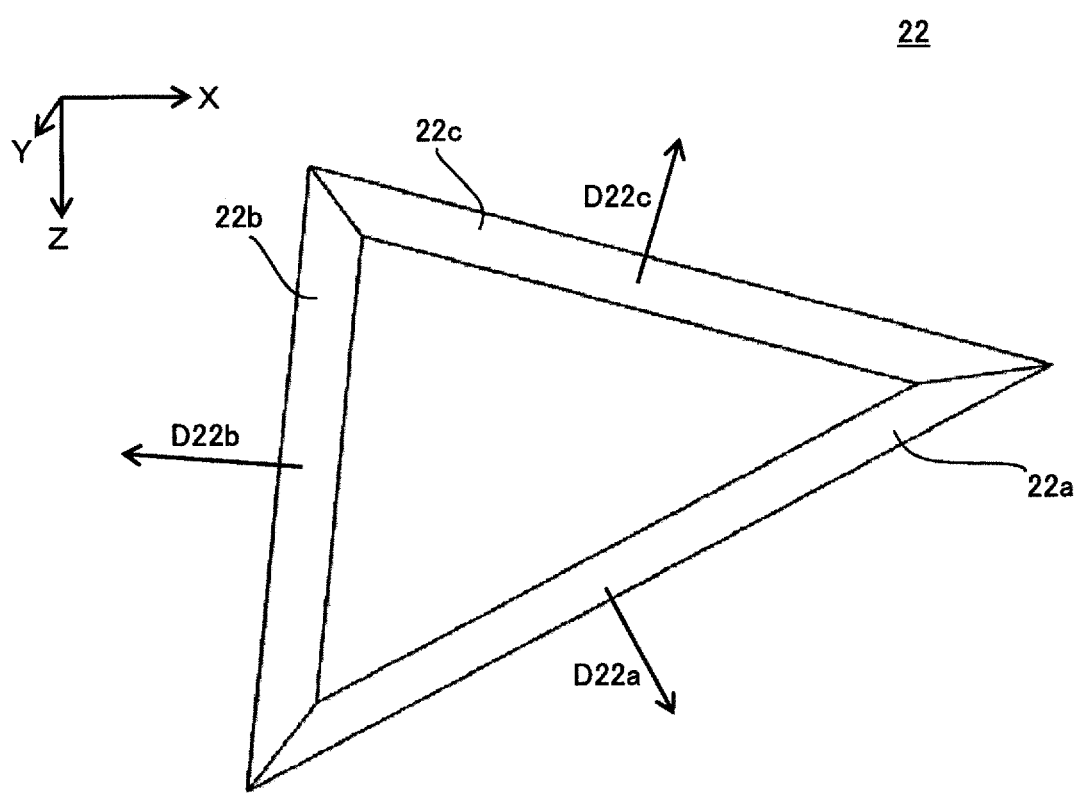
FIG. 5 is a perspective view showing normal lines of a red prism of the optical unit according to the first embodiment.

FIG. 5 is a perspective view of the red prism 22 in the optical unit 12 according to the present embodiment. FIG. 5 shows, in the red prism 22, a normal line D22a of the front surface 22a, a normal line D22b of the side surface 22b, and a normal line D22c of the red reflecting surface 22c. Each of the normal lines D22a to D22c is directed to the front side in the plane of the figure. As described above, in the optical unit 12 according to the present embodiment, the red prisms 22 is formed with the surfaces 22a to 22c being inclined such that the normal lines D22a to D22c (or equivalently normal vectors) of the front surface 22a, the side surface 22b, and the red reflecting surface 22c of the red prism 22 are out of coplanar with each other.

As shown in FIGS. 3(A) and 4(C), a top surface and a bottom surface of the blue prism 21 according to the present embodiment have an identical shape and are in parallel to each other, which shows that the normal lines of the surfaces 21a, 21b, and 21c on the sides are coplanar with each other.

1-3. TRP DMD

Figure 6:
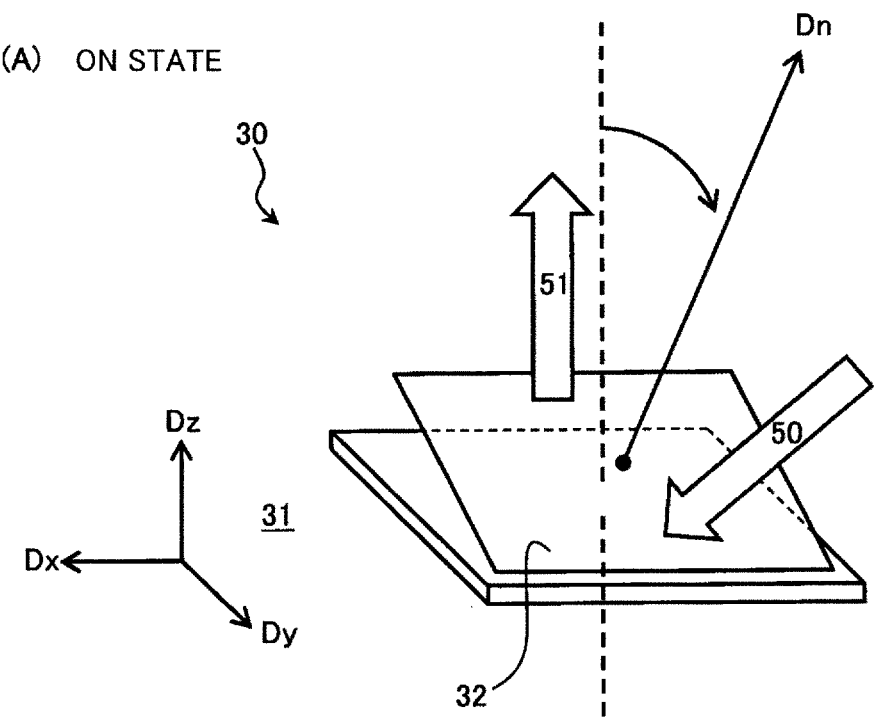
FIGS. 6(A)-(B) are diagrams for explaining a pixel in a DMD in the first embodiment.
Figure 6:
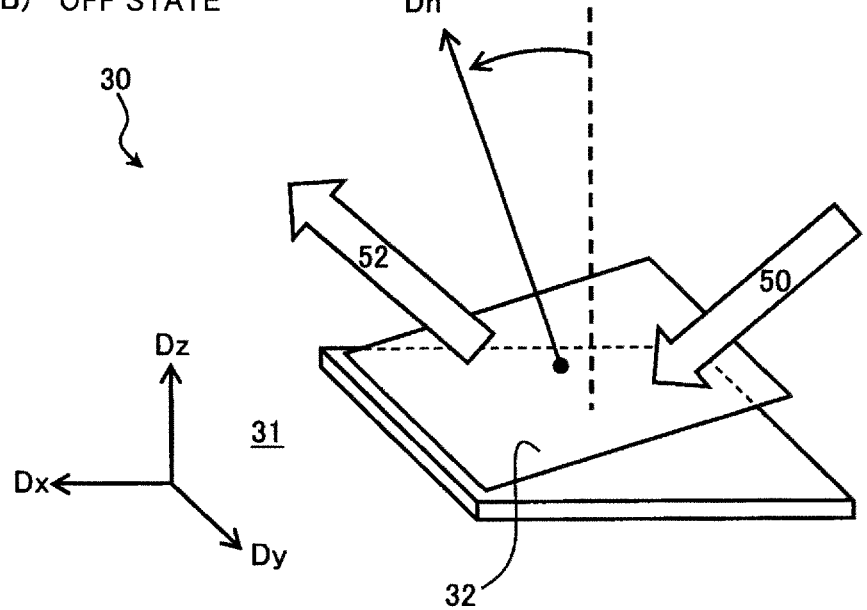

The TRP DMD 30 in the optical unit 12 according to the present embodiment will be described with reference to FIG. 6. FIG. 6 is a diagram for explaining a pixel 32 in the DMD 30 in the present embodiment.

The DMD 30 includes a plurality of pixels 32 disposed in a matrix in a horizontal direction Dx and a vertical direction Dy of the spatial light modulation surface 31. In the TRP DMD 30, each pixel 32 is configured by a micro mirror which is movable biaxially in tilt and roll. Each pixel 32 is driven to switch to either an ON state or an OFF state.

FIG. 6(A) exemplifies the ON state of the pixel 32 of the DMD 30. FIG. 6(B) exemplifies the OFF state of the pixel 32 in FIG. 6(A).

In the ON state, the pixel 32 is driven so that the pixel 32 is inclined with respect to the vertical direction Dy of the spatial light modulation surface 31 and parallel to the horizontal direction Dx, as illustrated in FIG. 6(A). In this case, a normal direction Dn of the pixel 32 is inclined toward +Dy with respect to a normal direction Dz of the spatial light modulation surface 31. On the other hand, in the OFF state, the pixel 32 is driven so that the pixel 32 is inclined with respect to the horizontal direction Dx of the spatial light modulation surface 31 and parallel to the vertical direction Dy, as illustrated in FIG. 6(B). In this case, the normal direction Dn of the pixels 32 is inclined toward +Dx with respect to the normal direction Dz of the spatial light modulation surface 31.

FIG. 6(A) exemplifies ON light 51 corresponding to illumination light 50 incident on the pixels 32. The ON light 51 is generated by the pixels 32 in the ON state reflecting the illumination light 50 in the DMD 30. The ON light 51 is an example of first modulated light in the present embodiment. FIG. 6(B) exemplifies OFF light 52 corresponding to the illumination light 50 similarly to FIG. 6(A). The OFF light 52 is generated by the pixels 32 in the OFF state reflecting the illumination light 50 in the DMD 30. The OFF light 52 is an example of second modulated light in the present embodiment.

In the TRP DMD 30, the illumination light 50, the ON light 51, and the OFF light 52 incident on the pixels 32 have optical paths in a three-dimensional positional relation that is not coplanar with each other. Consequently, a wide angle difference (e.g., 17°) can expand a range of taking in the light. In the optical unit 12 according to the present embodiment, the inclination of various surfaces can reduce a loss of light quantity inside the prisms 21 to 23 when the light is taken in.

2. Operation

Figure 7:
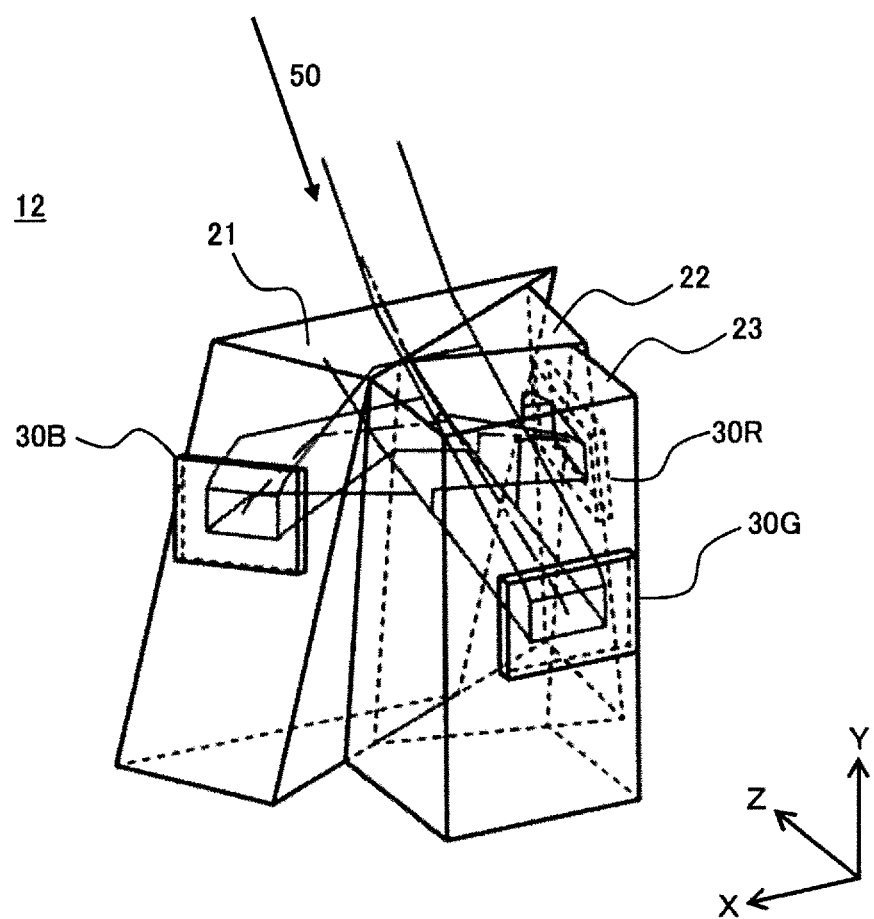
FIG. 7 is a perspective view of the optical unit, showing an optical path of illumination light in the first embodiment.
Figure 8:
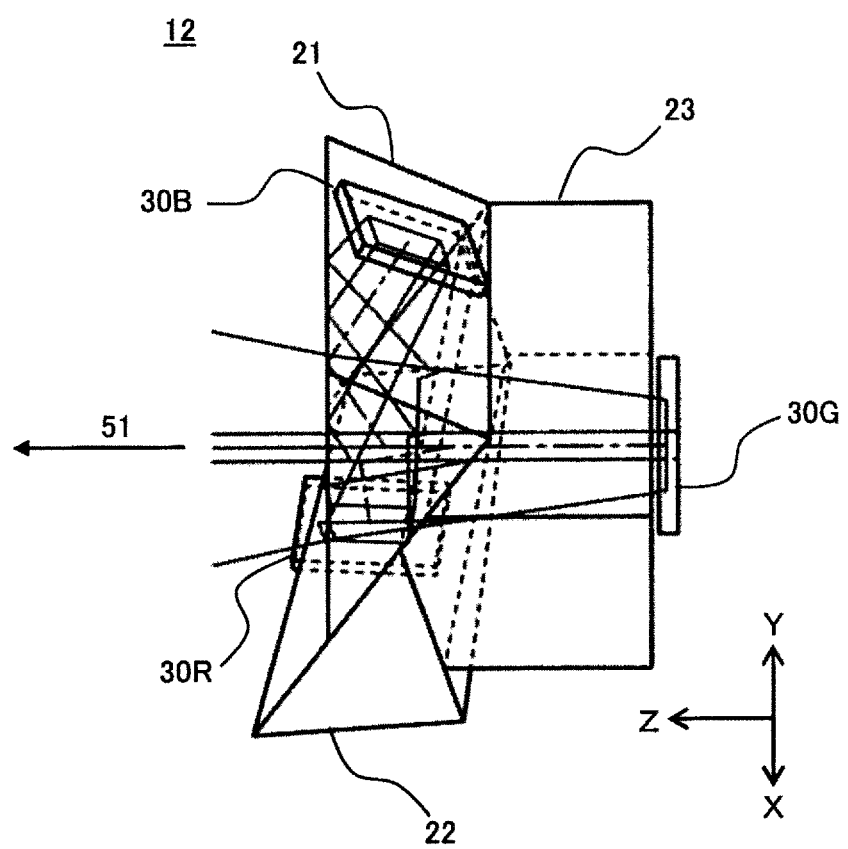
FIG. 8 is a perspective view of the optical unit, showing an optical path of ON light in the first embodiment.
Figure 9:
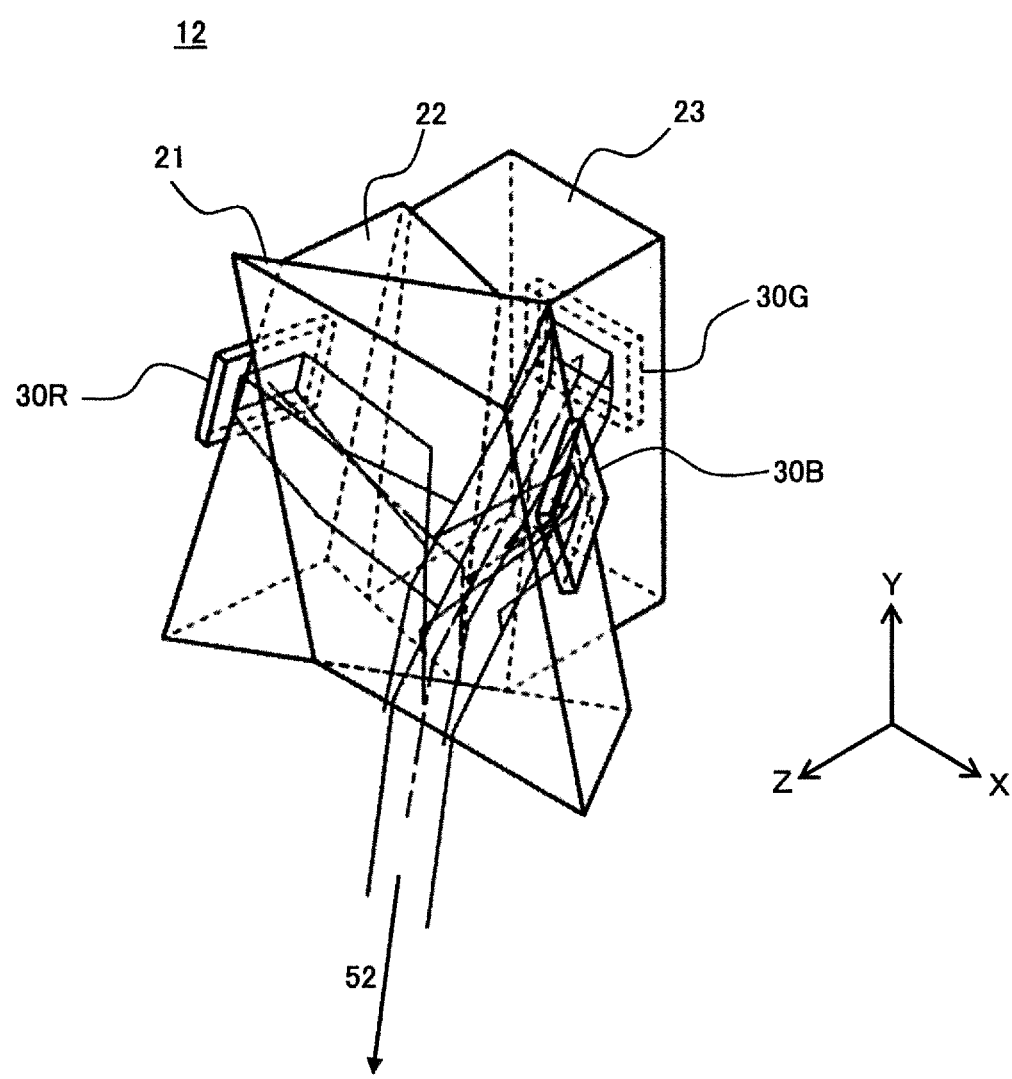
FIG. 9 is a perspective view of the optical unit, showing an optical path of OFF light in the first embodiment.

Operation of the projection device 1 using the optical unit 12 according to the present embodiment will be described with reference to FIGS. 7 to 9. FIG. 7 is a perspective view of the optical unit 12 showing the optical path of the illumination light 50 in the present embodiment. FIG. 8 shows the optical path of the ON light 51. FIG. 9 shows the optical path of the OFF light 52.

The projection device 1 according to the present embodiment generates the illumination light 50 in the projection light source 11 and supplies the generated illumination light 50 to the optical unit 12. As exemplified in FIG. 7, the illumination light 50 is irradiated from the +Y side at a front of the optical unit 12 toward below the Z direction to be incident on the optical unit 12. The illumination light 50 includes a blue component, a red component, and a green component that configure white light, for example.

In the optical unit 12, the incident illumination light 50 sequentially passes through the blue prism 21, the red prism 22 and the green prism 23 with each color component being separated, to reach the DMD 30 corresponding to each color component. When reflecting the illumination light 50 on the spatial light modulation surface 31, each DMD 30 generates the ON light 51 and the OFF light 52 (see FIG. 6) by controlling the ON/OFF state of each pixel 32 in accordance with the projection image under the control of the controller 14, for example.

As shown in FIG. 8, the ON light 51 is emitted forward from the optical unit 12 along the Z direction. The optical unit 12 synthesizes the ON light 51 by the prisms 21 to 23 such that the optical paths from the DMDs 30B to 30R for the three colors are matched at the time of external emission. In the projection device 1, the ON light 51 travels from the optical unit 12 in the Z direction and is taken into the projection optical system 13. By emitting the ON light 51 taken in the projection optical system 13 to the outside, the projection device 1 projects the projection image indicated by the ON light 51.

On the other hand, the OFF light 52 emits from the optical unit 12 in a different emitting direction from that of the ON light 51. In an example of FIG. 9, the emitting direction of the OFF light 52 is toward lower right with respect to the Z direction. This makes it possible to prevent the OFF light 52 from being taken into the projection optical system 13 and affecting the projection image.

In the TRP DMD 30, expanding a range of taking the ON light 51 into the projection optical system 13 from the optical unit 12 can increase brightness of the projection image by the projection device 1. According to the inclination of respective reflecting surfaces 21c and 22c, the optical unit 12 of the present embodiment can reduce the light loss for generating the ON light 51 based on the illumination light 50, and can facilitate the high brightness. Hereinafter, the optical path in the optical unit 12 according to the present embodiment will be described in detail.

2-1. Optical Path of Green Light

The optical path of the green light in the optical unit 12 will be described with reference to FIGS. 10 to 11.

Figure 10:
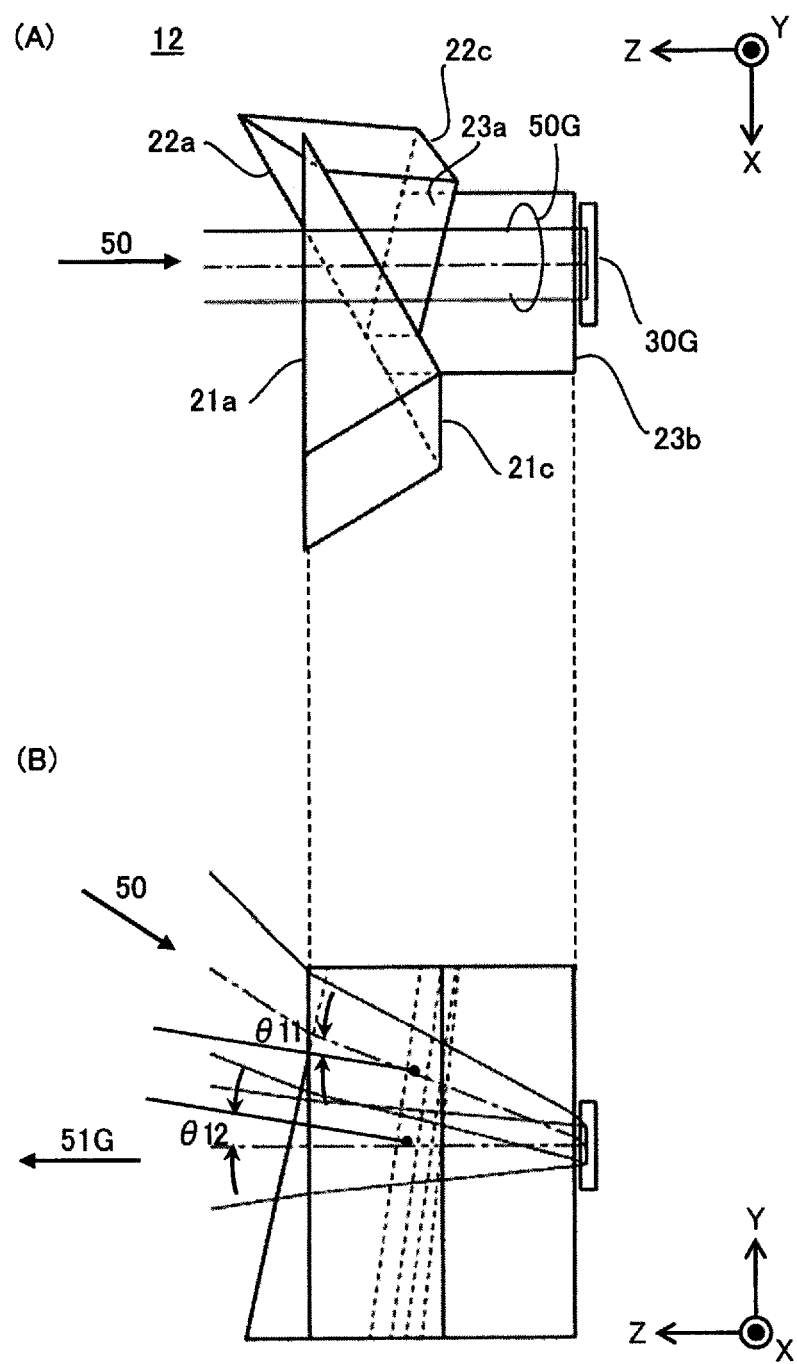
FIGS. 10(A)-(B) are diagrams exemplifying an optical path incident on a DMD for green in the optical unit.
Figure 11:
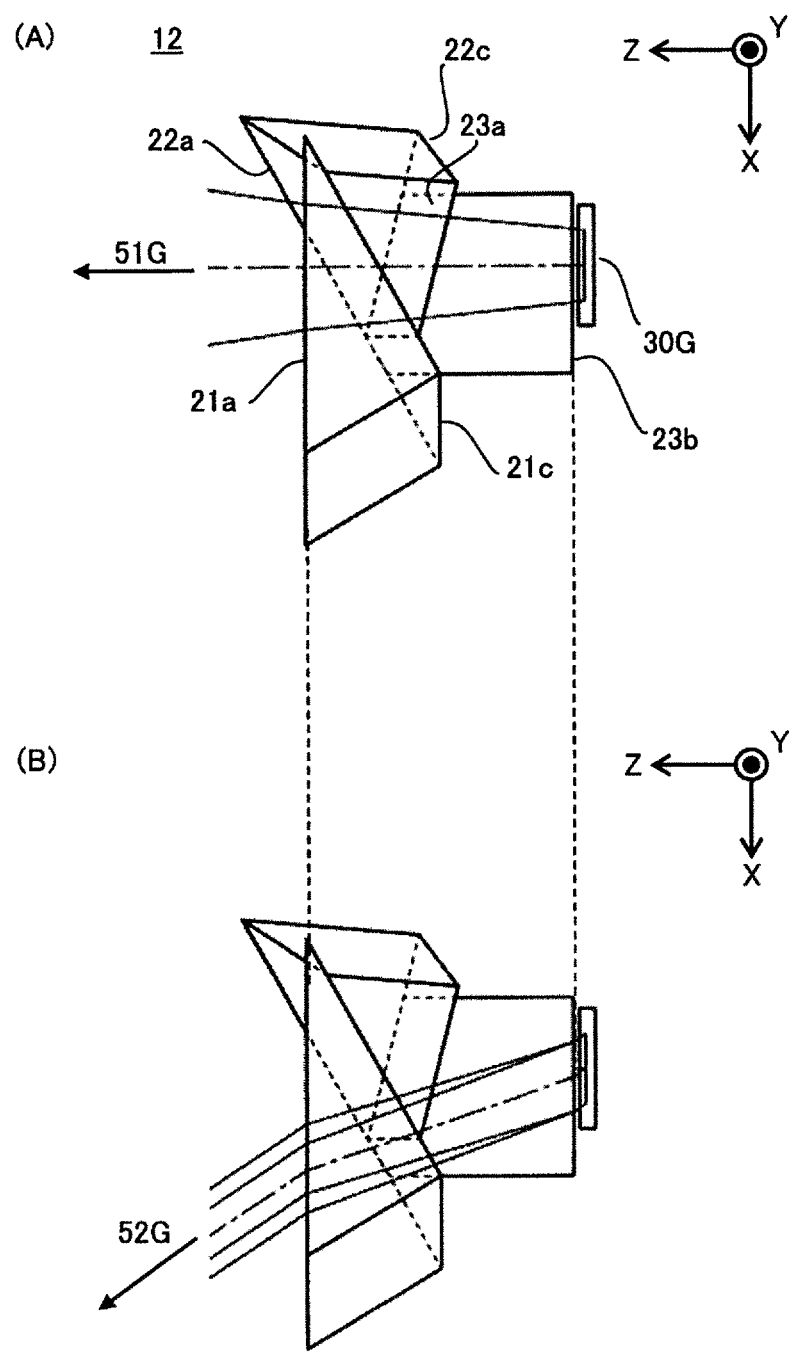
FIGS. 11(A)-(B) are diagrams exemplifying an optical path emitted from a DMD for green in the optical unit.

FIG. 10 is a diagram exemplifying an optical path incident on the DMD 30G for green in the optical unit 12. FIG. 11 is a diagram exemplifying an optical path emitted from the DMD 30G for green. In FIGS. 10 and 11, the DMD 30B for blue and the DMD 30R for red are not shown.

FIG. 10(A) shows the optical path of the illumination light 50 to the DMD 30G for green in a plan view of the optical unit 12. FIG. 10(B) shows the illumination light 50 and the optical paths of the ON light 51G by the DMD 30G for green in a side view of the optical unit 12.

When entering the optical unit 12, the illumination light 50 travels from the front surface 21a of the blue prism 21 to the blue reflecting surface 21c. The blue prism 21 reflects the blue component of the incident illumination light 50 on the blue reflecting surface 21c (see FIG. 12) and transmits the remaining component. The component of the illumination light 50 transmitted from the blue prism 21 is incident on the front surface 22a of the red prism 22 and travels to the red reflecting surface 22c. The red prism 22 reflects the red component of the incident illumination light 50 on the red reflecting surface 22c (see FIG. 14) and transmits the remaining component.

According to the transmission of the blue reflecting surface 21c and the red reflecting surface 22c in the optical unit 12, the component of the illumination light 50 that is incident on the green prism 23 is a green component (hereinafter referred to as "green light 50G"). The green prism 23 passes the green light 50G incident from the front surface 23a and guides the green light 50G from the side surface 23b to the DMD 30G for green.

In the optical unit 12 according to the present embodiment, the blue reflecting surface 21c and the red reflecting surface 22c are inclined from the Y direction, with respective normal lines more close to an incident direction of the illumination light 50 than the Z direction as shown in FIG. 10(B). Therefore, the incident angle θ11, at which the illumination light 50 including the green light 50G and the like is incident on the reflecting surfaces 21c and 22c, is smaller than that in a case where the reflecting surfaces are parallel to the Y direction.

Regarding a reflecting surface formed by dichroic coating or the like, it is generally known that a large light incident angle reduces the efficiency of optical characteristics of selectively reflecting a component in a specific wavelength band. In this case, the accuracy of color separation for the illumination light degrades, resulting in a loss of light quantity. In contrast to this, the optical unit 12 according to the present embodiment, with the incident angle θ11 of the illumination light 50 on each of the reflecting surfaces 21c and 22c being smaller, performs color separation accurately, so that the light loss from the illumination light 50 can be reduced.

FIG. 11(A) shows the optical path of the ON light 51G of the DMD 30G for green corresponding to the green light 50G in FIG. 10 in a plan view of the optical unit 12. The DMD 30G for green reflects the green light 50G incident on the pixels 32 in the ON state to generate the ON light 51G. The normal direction Dn of the pixels 32 of the DMD 30G for green is inclined to the +Y side with respect to the Z direction in the ON state (see FIG. 6(A)). The ON light 51G of the DMD 30G for green passes sequentially through the green prism 23, the red prism 22, and the blue prism 21 along the Z direction, and is emitted forward from the optical unit 12 as shown in FIGS. 10(B) and 11(A).

In the optical unit 12 according to the present embodiment, the inclination of the blue reflecting surface 21c and the red reflecting surface 22c makes a difference between the incident angle θ11 of the illumination light 50 and an emission angle θ12 of the ON light 51G smaller than that without the inclination. Accordingly, it is possible to reduce the light loss for generating the ON light 51 from the illumination light 50 in the optical unit 12.

FIG. 11B shows the optical path of the OFF light 52G of the DMD 30G for green corresponding to the green light 50G in FIG. 10 in a plan view of the optical unit 12. The DMD 30G for green reflects the green light 50G incident on the pixels 32 in the OFF state to generate the OFF light 52G. In the OFF state, the normal direction Dn of the pixels 32 of the DMD 30G for green is inclined to the +X side with respect to the Z direction (see FIG. 6(B)). The emitting direction of the OFF light 52G of the DMD 30G for green emitted from the optical unit 12 is on the +X side and the −Y side with respect to the emitting direction of the ON light 51G.

2-2. Optical Path of Blue Light

The optical path of blue light in the optical unit 12 will be described with reference to FIGS. 12 to 13.

Figure 12:
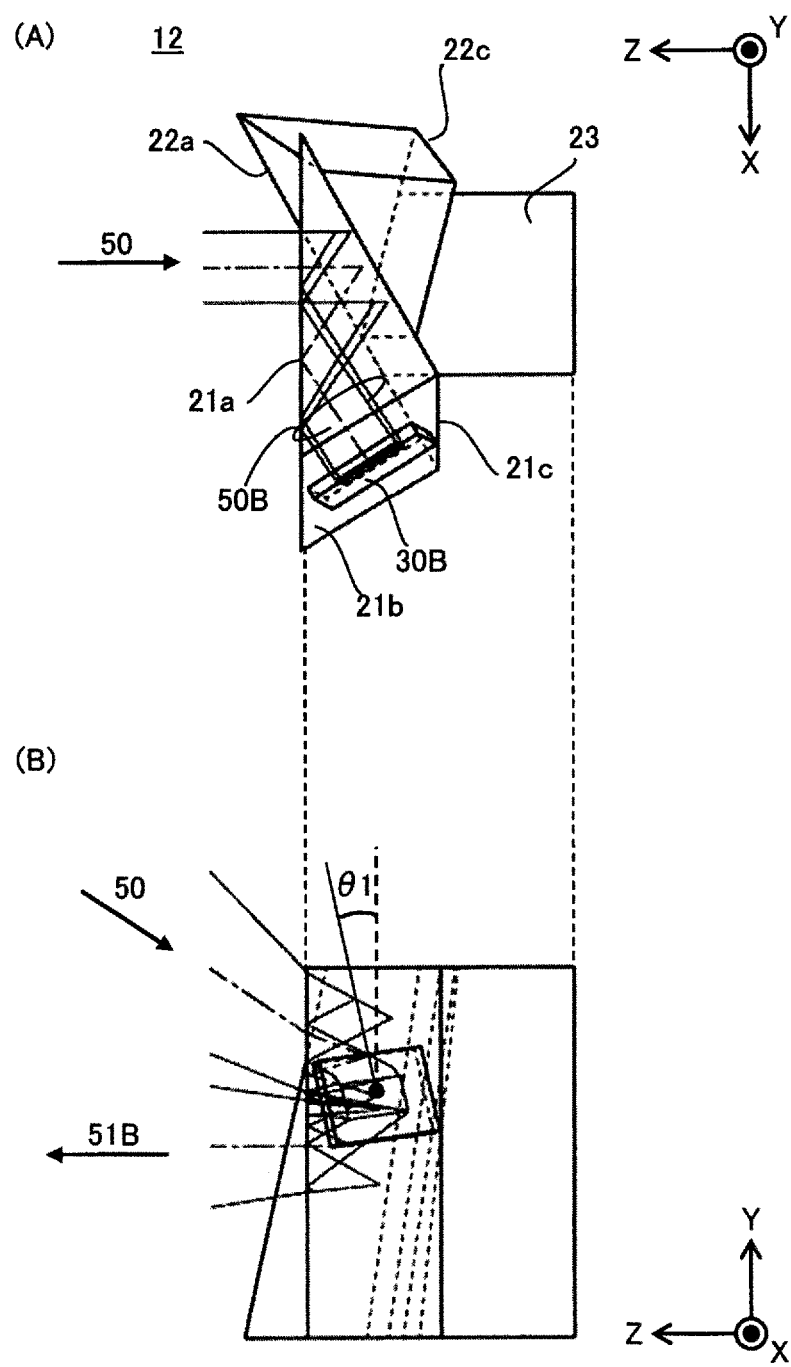
FIGS. 12(A)-(B) are diagrams for explaining an optical path incident on a DMD for blue in the optical unit.
Figure 13:
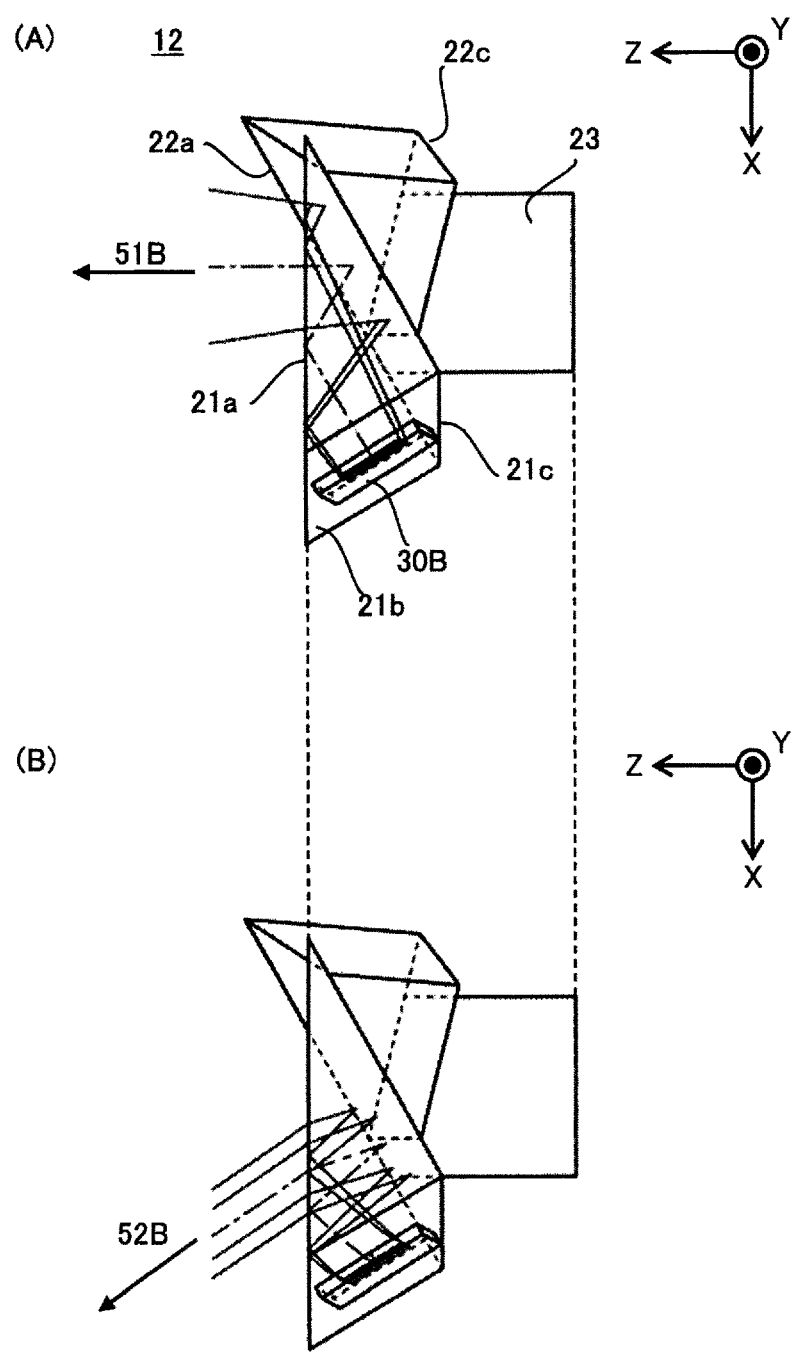
FIGS. 13(A)-(B) are diagrams for explaining an optical path emitted from the DMD for blue in the optical unit.

FIG. 12 is a diagram exemplifying an optical path incident on the DMD 30B for blue in the optical unit 12. FIG. 13 is a diagram exemplifying an optical path emitted from the DMD 30B for blue. In FIGS. 12 and 13, the DMD 30R for red and the DMD 30G for green are not shown.

FIG. 12(A) shows the optical path of the illumination light 50 to the DMD 30B for blue in a plan view of the optical unit 12. FIG. 12(B) shows the optical path of the illumination light 50 and the ON light 51B by the DMD 30B for blue in a side view of the optical unit 12.

As shown in FIG. 12(A), blue light 51B, which is a blue component of the illumination light 50, is reflected by the blue reflecting surface 21c. The blue prism 21 totally reflects the blue light 51B from the blue reflecting surface 21c on the front surface 21a and guides the blue light 51B from the side surface 21b to the DMD 30B for blue.

The DMD 30B for blue generates the ON light 51B and OFF light 52B by reflecting the blue light 51B in accordance with the ON or OFF state of the pixels 32, respectively. As shown in FIG. 12(B), the vertical direction of the DMD 30B for blue is on the side surface 21b of the blue prism 21 and is directed at the angle θ1 with respect to the Y direction. The normal direction Dn (see FIG. 6) of the pixels 32 in the DMD 30B for blue is inclined to the +Y side in the ON state and to the +Z side (and +X side) in the OFF state.

FIG. 13(A) shows the optical path of the ON light 51B of the DMD 30B for blue corresponding to the blue light 50B in FIG. 12 in a plan view of the optical unit 12. The ON light 51B emitted from the DMD 30B for blue is totally reflected by the front surface 21a of the blue prism 21 and further reflected by the blue reflecting surface 21c of the blue prism 21. The optical path of the ON light 51B of the DMD 30B for blue matches the optical path of the ON light 51G of the DMD 30G for green after the the ON light 51B is reflected by the blue reflecting surface 21c, according to the inclination of the side surface 21b of the blue prism 21, the position and orientation of the DMD 30B for blue on the side surface 21b, and the like.

FIG. 13(B) shows the optical path of the OFF light 52B of the DMD 30B for blue corresponding to the blue light 50B in FIG. 12 in a plan view of the optical unit 12. The OFF light 52B of the DMD 30B for blue is reflected by the front surface 21a and the blue reflecting surface 21c of the blue prism 21, and is emitted from the optical unit 12, similarly to the ON light 51B. Also regarding the DMD 30B for blue, the emitting direction of the OFF light 52B is on the +X side and the −Y side with respect to the ON light 51B.

In the optical unit 12 according to the present embodiment, the inclination of the blue reflecting surface 21c and the like can reduce the light loss for generating the ON light 51B of the DMD 30B for blue from the blue light 50B in the illumination light 50 as described above.

2-3. Optical Path of Red Light

The optical path of red light in the optical unit 12 will be described with reference to FIGS. 14 to 15.

Figure 14:
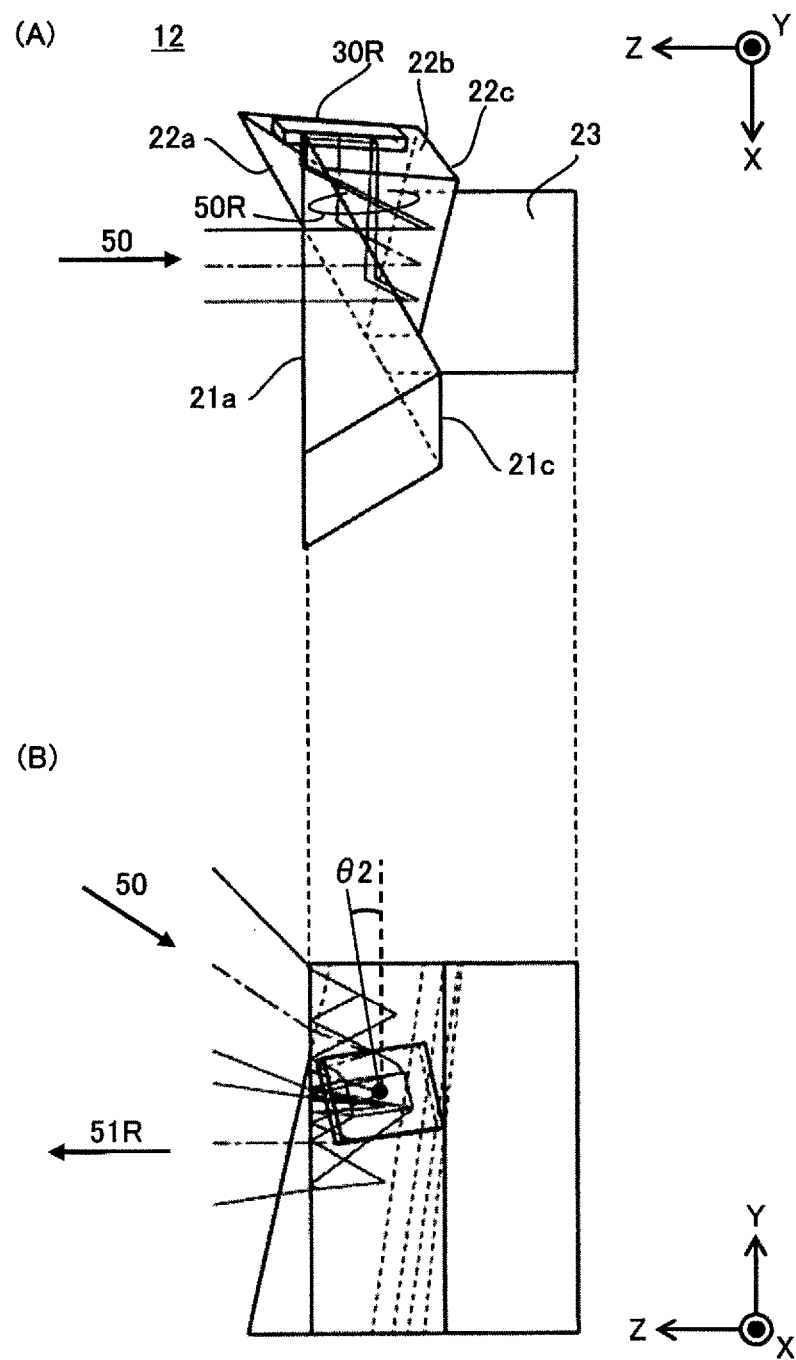
FIGS. 14(A)-(B) are diagrams for explaining an optical path incident on a DMD for red in the optical unit.
Figure 15:
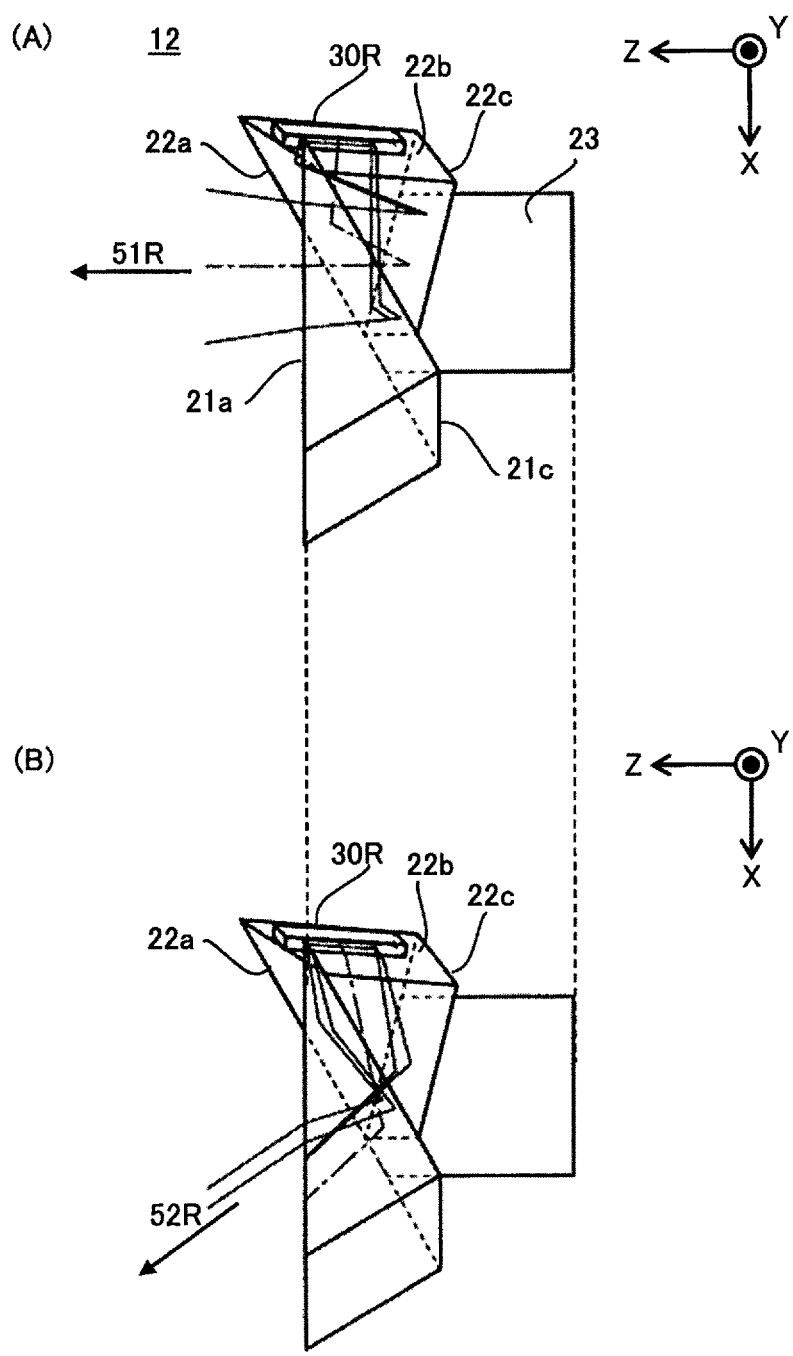
FIGS. 15(A)-(B) are diagrams for explaining an optical path emitted from the DMD for red in the optical unit.

FIG. 14 is a diagram exemplifying an optical path incident on the DMD 30R for red in the optical unit 12. FIG. 15 is a diagram exemplifying an optical path emitted from the DMD 30R for red. In FIGS. 14 and 15, the DMD 30B for blue and the DMD 30G for green are not shown.

FIG. 14(A) shows the optical path of the illumination light 50 to the DMD 30R for red in a plan view of the optical unit 12. FIG. 14(B) shows the optical paths of the illumination light 50 and the ON light 51R by the DMD 30R for red in a side view of the optical unit 12.

As shown in FIG. 14(A), red light 50R, which is a red component of the illumination light 50, passes through the blue prism 21 and is reflected by the red reflecting surface 22c of the red prism 22. The red prism 22 totally reflects the red light 50R from the red reflecting surface 22c on the front surface 22a and guides the red light 50R from the side surface 22b to the DMD 30R for red.

The DMD 30R for red generates the ON light 51R and OFF light 52R by reflecting the red light 50R in accordance with the ON or OFF state of the pixels 32, respectively. As shown in FIG. 14(B), the vertical direction of the DMD 30R for red is, on the side surface 22b of the red prism 22, directed at the angle θ2 with respect to the Y direction. The normal direction Dn (see FIG. 6) of the pixels 32 in the DMD 30R for red is inclined to the +Y side in the ON state and to the −Z side (and +X side) in the OFF state.

FIG. 15(A) shows the optical path of the ON light 51R of the DMD 30R for red corresponding to the red light 50R in FIG. 14 in a plan view of the optical unit 12. The ON light 51R emitted from the DMD 30R for red is totally reflected by the front surface 22a of the red prism 22 and further reflected by the red reflecting surface 22c. The ON light 51R from the red reflecting surface 22c is emitted from the front surface 22a of the red prism 22 and transmits through the blue reflecting surface 21c of the blue prism 21. The optical path of the ON light 51R of the DMD 30R for red matches the optical paths of the other ON lights 51G and 51B after the ON light 51R transmits through the blue reflecting surface 21c.

FIG. 15(B) shows the optical path of the OFF light 52R of the DMD 30R for red corresponding to the red light 50R in FIG. 14 in a plan view of the optical unit 12. In the OFF light 52R emitted from the DMD 30R for red, a light flux on the +Z side is incident on the front surface 22a of the red prism 22, and totally reflected to reach the red reflecting surface 22c. A light flux on the −Z side is incident on the red reflecting surface 22c directly from the DMD 30R for red without passing through the front surface 22a. Then, the OFF light 52R from the red reflecting surface 22c is emitted to the +X side and the −Y side with respect to the ON light 51R. The optical paths of the ON light 51R and the OFF light 52R as described above can be set by the inclination of the side surface 22b of the red prism 22, the position and orientation of the DMD 30R for red on the side surface 22b, and the like.

In the optical unit 12 according to the present embodiment, the inclination of the red reflecting surface 22c and the like can reduce the light loss for generating the ON light 51R of the DMD 30R for red from the red light 50R in the illumination light 50 as described above. Further, the optical unit 12 can be downsized by using an optical path in which a part of the OFF light 52R is directly incident on the red reflecting surface 22c.

3. Summary

As described above, the optical unit 12 according to the present embodiment includes the blue prism 21 as an example of a first prism, the red prism 22 as an example of a second prism, and the green prism 23 as an example of a third prism. The blue prism 21 has a blue reflecting surface 21c as the first coated surface configured to reflect the illumination light in the first wavelength band, the front surface 21a as the first surface configured to transmit the illumination light to guide the illumination light to the blue reflecting surface 21c and configured to reflect the illumination light reflected by the blue reflecting surface 21c, and the side surface 21b as the first light transmitting surface configured to transmit the illumination light reflected by the front surface 21a. The red prism 22 has the red reflecting surface 22c as the second coated surface configured to reflect the illumination light in the second wavelength band, the front surface 22a as the second surface configured to transmit the illumination light transmitted from the red reflecting surface 22c, to guide the illumination light to the red reflecting surface 22c, and configured to reflect the illumination light reflected by the red reflecting surface 22c, and the side surface 22b as the second light transmitting surface configured to transmit the illumination light reflected by the front surface 22a. The green prism 23 has the front surface 23a as the third light transmitting surface configured to transmit the illumination light transmitted from the blue reflecting surface 21c and the red reflecting surface 22c, and the side surface 23b as the fourth light transmitting surface configured to transmit the illumination light transmitted from the front surface 23a. The red prism 22 is formed with the respective normal lines D22c, D22a, and D22b of the red reflecting surface 22c, the front surface 22a, and the side surface 22b being out of coplanar with each other.

In the optical unit 12 described above, the inclination of the red reflecting surface 22c and the like of the red prism 22 can reduce the light loss from the illumination light 50. Instead of or in addition to the red prism 22, the blue prism 21 may be formed with the respective normal lines of the blue reflecting surface 21c, the front surface 21a, and the side surface 21b being out of coplanar with each other.

The optical unit 12 according to the present embodiment includes the blue prism 21 as an example of the first prism, the red prism 22 as an example of the second prism, and the green prism 23 as an example of the third prism. The blue prism 21 has the front surface 21a as the first surface configured to transmit light and the blue reflecting surface 21c as the first coated surface configured to reflect light in the first wavelength band. The red prism 22 has the front surface 22a as the second surface closer to the blue reflecting surface 21c than the front surface 21a of the blue prism 21, and the red reflecting surface 22c as the second coated surface configured to reflect light in the second wavelength band different from the first wavelength band. The green prism 23 has the front surface 23a as the third light transmitting surface closer to the red reflecting surface 22c than the front surface 22a of the red prism 22, and the side surface 23b as the fourth light transmitting surface having a height direction and a width direction intersecting with each other. The green prism 23 is located between the blue prism 21 and the red prism 22 in the width direction of the side surface 23b (i.e., the X direction). The prisms 21 to 23 are arranged with the blue reflecting surface 21c and the red reflecting surface 22c being inclined with respect to the height direction of the side surface 23b of the green prism 23 (i.e., the Y direction). Thus, the inclination of the reflecting surfaces 21c and 22c can efficiently reflect the components of the wavelength bands, and can reduce the light loss from the illumination light 50.

In the present embodiment, both the blue reflecting surface 21c and the red reflecting surface 22c are inclined to the same side with respect to the Y direction, as on the +Z side. Thus, by making the illumination light 50 incident on the optical unit 12 from the +Z side, an incident angle θ11 of the illumination light 50 is decreased, and the light loss in the optical unit 12 can be reduced.

In the optical unit 12 according to the present embodiment, the blue reflecting surface 21c of the blue prism 21 and the front surface 22a of the red prism 22 are adjacent to each other. The blue prism 21 and the green prism 23 are arranged with the front surface 21a of the blue prism 21 and the side surface 23b of the green prism 23 being parallel to each other. As a result, the optical unit 12 can be configured to be compact by the three prisms 21 to 23.

In the present embodiment, the optical unit 12 further includes the DMD 30B for blue (first spatial light modulator) arranged adjacent to the side surface 21b with the illumination light transmitted from the side surface 21b of the blue prism 21 being incident thereon, the DMD 30R for red (second spatial light modulator) arranged adjacent to the side surface 22b with the illumination light transmitted from the side surface 22b of the red prism 22 being incident thereon, and the DMD 30G for green (third spatial light modulator) arranged adjacent to the side surface 23b with the illumination light transmitted from the side surface 23b of the green prism 23 being incident thereon. The optical unit 12 makes it possible to reduce the light loss for generating the ON light 51B, 51R, and 51G of the DMDs 30B, 30R, and 30G from the illumination light 50.

In the present embodiment, the DMDs 30B, 30R, and 30G are configured to generate the ON light 51 (first modulated light) and the OFF light 52 (second modulated light) emitted in mutually different directions based on the incident illumination light. the prisms 21 to 23 are arranged with at least one of the blue reflecting surface 21c and the red reflecting surface 22c being out of orthogonal to the optical axis of the ON light 51 on a YZ plane, that is, a plane including an optical axis of the illumination light 50 incident on the DMD 30G for green and an optical axis of the ON light 51 from the DMD 30G for green (see FIG. 10(B)). This makes it possible to appropriately set the incident angle 811 of the illumination light 50 and the like, and to reduce the light loss in the optical unit 12.

In the present embodiment, the DMD 30R for red may be arranged with a part of the OFF light 52R emitted from the DMD 30R for red being reflected by the front surface 22a to be incident on the red reflecting surface 22c, and with the rest of the OFF light 52R being incident on the red reflecting surface 22c without passing through the front surface 22a. The optical unit 12 can be downsized by adopting such an optical path of the OFF light 52R.

In the present embodiment, each DMD 30B, 30R, and 30G is a TRP DMD. The optical unit 12 according to the present embodiment makes it possible to reduce the light loss caused when the TRP DMD 30 generates the ON light 51.

In the present embodiment, the projection device 1 includes the optical unit 12 and the projection light source 11 configured to supply the illumination light 50 incident on the optical unit 12. The projection device 1 according to the present embodiment makes it possible to reduce the light loss from the illumination light 50 from the projection light source 11.

Second Embodiment

A second embodiment will be described below with reference to the drawings. The optical unit 12 according to the first embodiment includes the three prisms 21 to 23. In the second embodiment, an optical unit including four prisms will be described with reference to FIGS. 16 to 19.

The optical unit according to the present embodiment will be described while descriptions of the same configurations and operations as those of the optical unit 12 and the projection device 1 according to the first embodiment are appropriately omitted.

Figure 16:
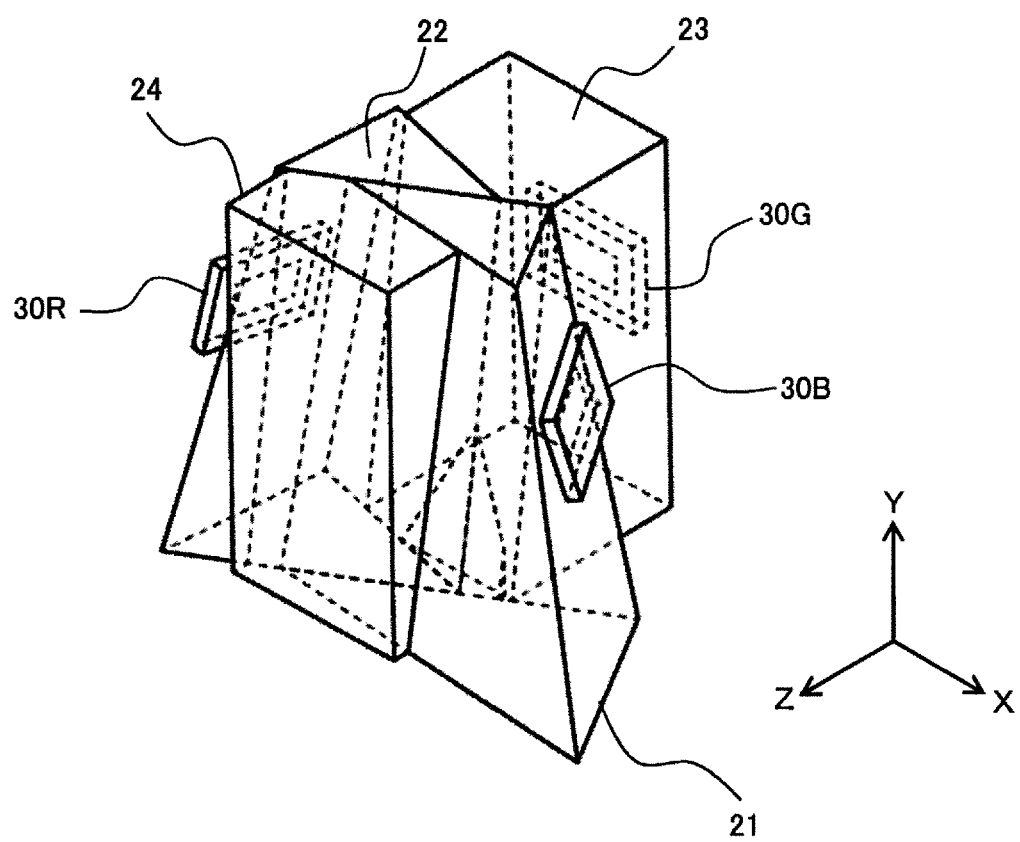
FIG. 16 is a perspective view exemplifying an optical unit according to a second embodiment.
Figure 17:
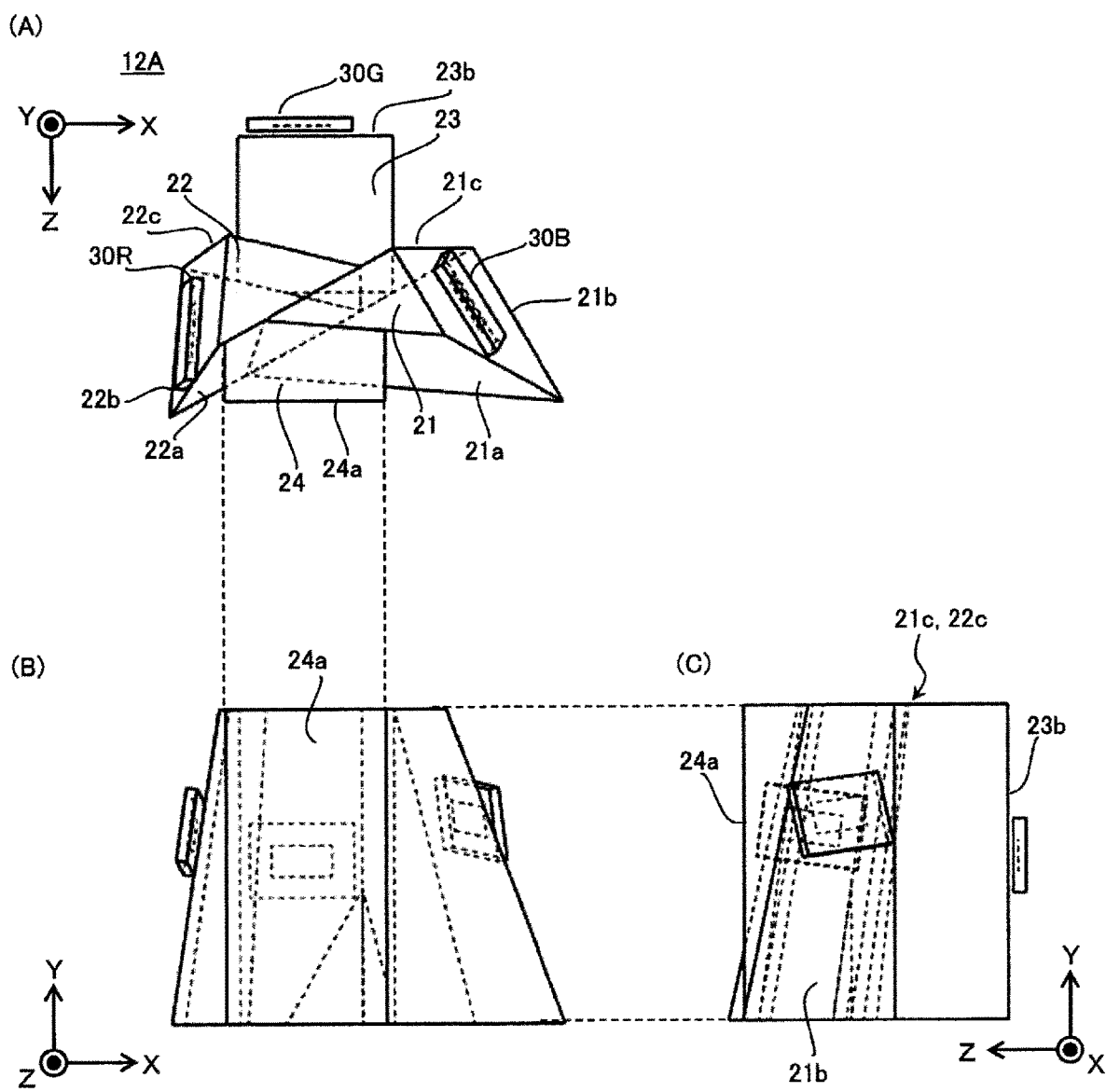
FIGS. 17(A)-(C) are tridedral views exemplifying a configuration of the optical unit according to the second embodiment.

FIG. 16 is a perspective view exemplifying an optical unit 12A according to the second embodiment. FIG. 17 is a trihedral view exemplifying a configuration of the optical unit 12A according to the present embodiment. FIG. 17(A) is a plan view of the optical unit 12A. FIG. 17(B) is a rear view of the optical unit 12A. FIG. 17(C) is a left side view of the optical unit 12A.

The optical unit 12A according to the present embodiment includes a fourth prism 24 in addition to the three prisms 21 to 23. The prism 24 has a light-transmissive property similarly to the green prism 23, for example. The prism 24 is an example of the fourth prism in the present embodiment.

In an example of FIGS. 16 and 17, the prism 24 is disposed at a front part of the blue prism 21, that is, on a frontmost side of the optical unit 12A. The prism 24 in this example has a front surface 24a parallel to the XY plane.

The prism 24 is adjacent to the blue prism 21 and the red prism 22 on the rear side. In this example, the front surface 21a of the blue prism 21 is inclined from the XY plane.

In this example as shown in FIG. 16(A), the top surface and the bottom surface of the blue prism 21 have different shapes. That is, the blue prism 21 in this example is formed such that the normal lines of the surfaces 21a, 21b, and 21c are not coplanar with each other. The same applies to the red prism 22.

As described above, in the optical unit 12A according to the present embodiment, the blue prism 21 is formed with the respective normal lines of the blue reflecting surface 21c, the front surface 21a, and the side surface 21b being out of coplanar with each other. Moreover, the red prism 22 is formed with the respective normal lines of the red reflecting surface 22c, the front surface 22a, and the side surface 22b being out of coplanar with each other. This can efficiently reflect the components of the wavelength bands, and can reduce the light loss from the illumination light 50.

Further, the optical unit 12A according to the present embodiment has the front surface 24a (fifth light transmitting surface) parallel to the side surface 23b of the green prism 23, and may further include the fourth prism 24 adjacent to the front surface 21a of the blue prism 21. The blue reflecting surface 21c of the blue prism 21 and the front surface 22a of the red prism 22 may be adjacent to each other. In this case, as in the first embodiment, the inclination of the reflecting surfaces 21c and 22c can reduce the light loss.

The fourth prism 24 does not have to be disposed on the frontmost side of the optical unit 12A. A modification of the second embodiment will be described with reference to FIGS. 18 and 19.

Figure 18:
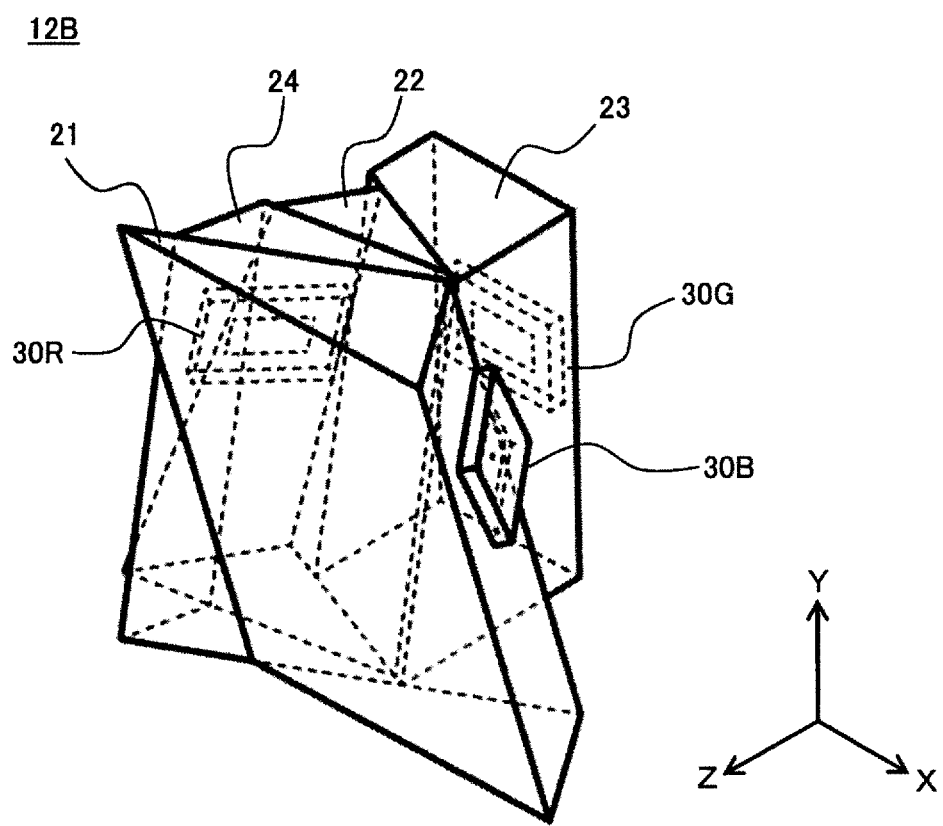
FIG. 18 is a perspective view showing an optical unit according to a modification of the second embodiment.
Figure 19:
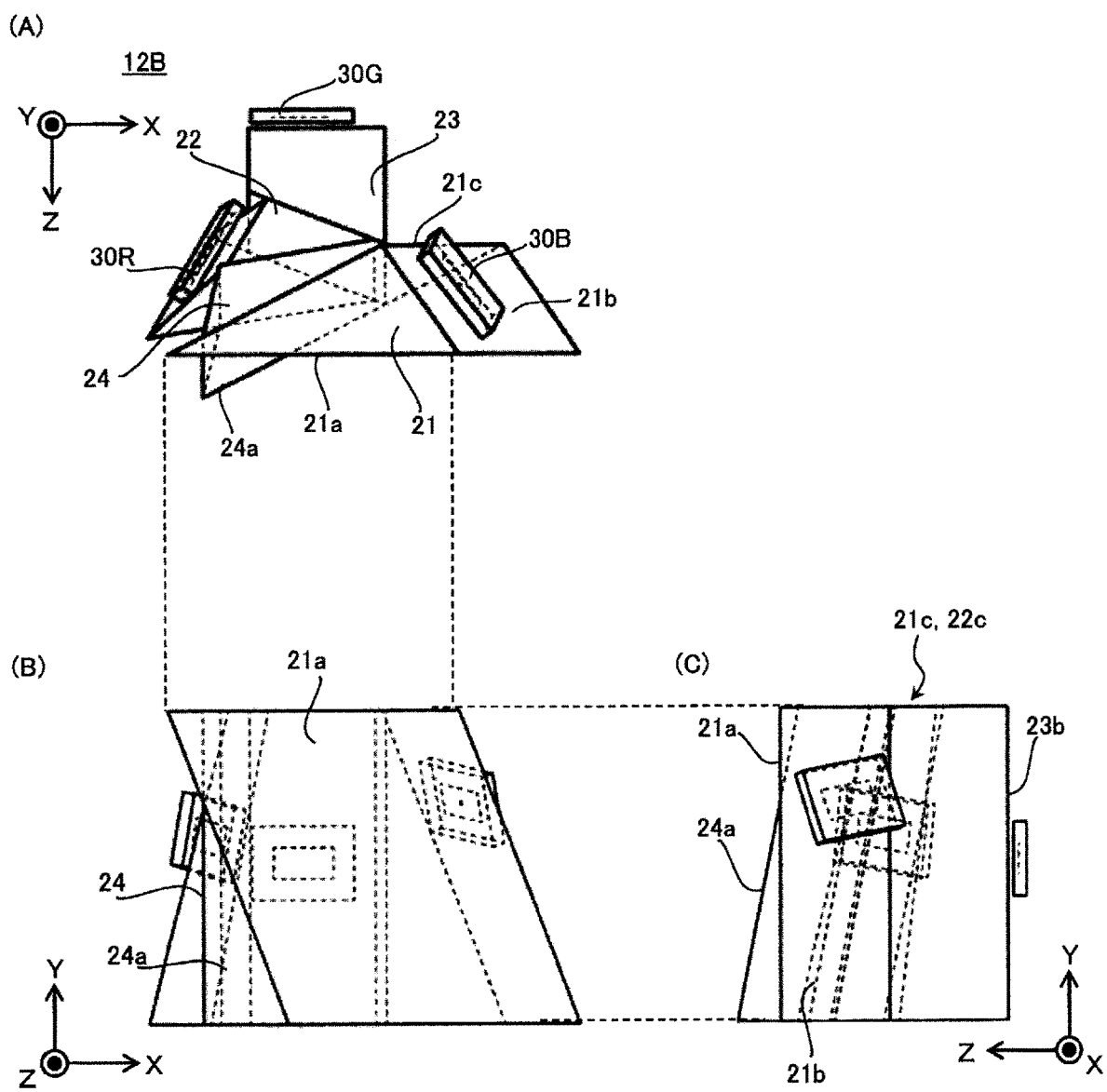
FIGS. 19(A)-(C) are trihedral views showing a configuration of the optical unit according to the modification of the second embodiment.

FIG. 18 is a perspective view showing an optical unit 12B according to the modification of the second embodiment. FIG. 19 is a trihedral view exemplifying a configuration of the optical unit 12B according to this modification. FIG. 19(A) is a plan view of the optical unit 12B. FIG. 19(B) is a rear view of the optical unit 12B. FIG. 19(C) is a left side view of the optical unit 12B.

In the optical unit 12B according to this modification, the fourth prism 24 is disposed between the blue prism 21 and the red prism 22. In this case, the front surface 21a of the blue prism 21 is on the frontmost side of the optical unit 12B and is parallel to the XY plane as in the first embodiment. In this modification, instead of applying the dichroic coating to the blue prism 21, the dichroic coating may be applied to the front surface 24a of the prism 24, for example. Thereby, the side surface of the blue prism 21 adjacent to the front surface may function as the blue reflecting surface 21c.

As described above, in the present embodiment, the optical unit 12B may further include the prism 24 (fourth prism) disposed between the blue prism 21 and the red prism 22. In this case, as in the first embodiment, the inclination of the reflecting surfaces 21c and 22c can reduce the light loss.

Other Embodiments

As described above, the first and second embodiments have been described as examples of the technique disclosed in the present application. However, the technique in the present disclosure is not limited to the embodiments, and is also applicable to the embodiment in which changes, replacements, additions, omissions, or the like are appropriately made. Further, it is also possible to combine the constituent elements described in each of the embodiments to form a new embodiment. Therefore, other embodiments will be exemplified below.

In the first and second embodiments, the optical units 12 to 12B have been described in which the blue reflecting surface 21c and the red reflecting surface 22c are inclined with respect to the Y direction. The optical unit according to the present embodiment may be configured such that one of the blue reflecting surface 21c and the red reflecting surface 22c is inclined with respect to the Y direction and the other is parallel to the Y direction. In this case, it is possible to efficiently reflect the components of the corresponding wavelength band on the inclined reflecting surface and to reduce the light loss from the illumination light 50. That is, in the present embodiment, the first, second, and third prisms may be arranged with at least one of the first coated surface and second coated surface being inclined with respect to the height direction of the fourth light transmitting surface.

In the above embodiments, an example has been described where the horizontal and vertical directions of the DMD 30G for green are parallel to the width direction and the height direction of the side surface 23b of the green prism 23. However, the arrangement of the DMD 30G for green is not particularly limited to the above embodiments. In the present embodiment, the DMD 30G for green may be appropriately inclined on the side surface 23b of the green prism 23. In this case, the light loss can be reduced by inclining the reflecting surfaces 21c and 22c with respect to the height direction of the side surface 23b of the green prism 23.

In the above embodiments, the wavelength band including blue light is illustrated as an example of the first wavelength band, and the wavelength band including blue light is illustrated as an example of the second wavelength band. In the present embodiment, the first and second wavelength bands are not limited to the above embodiments but may be various wavelength bands. For example, the first wavelength band may be a wavelength band including red light and the second wavelength band may be a wavelength band including blue light.

In the above embodiments, an example in which the DMD 30 is the TRP system has been described. The optical unit according to the present embodiment is not limited to the TRP DMD but may be applied to various spatial light modulators, for example, a voltage scalable pixel (VSP) DMD.

In the above embodiments, the optical units 12 to 12B including the DMD 30 have been described. The optical unit according to the present embodiment may be provided as a module separate from the DMD 30 and the like. That is, the optical unit according to the present embodiment does not need to include the spatial light modulator such as the DMD 30 but may be configured with prism optical systems such as the prisms 21 to 23. The optical unit can be configured such that at least one of the first coated surface and the second coated surface is inclined with respect to the height direction of the fourth light transmitting surface, and thus the light loss of the incident illumination light can be reduced.

As described above, the embodiments have been described as examples of the technique in the present disclosure. To that end, the accompanying drawings and detailed description are provided.

Among the constituent elements described in the accompanying drawings and the detailed description, not only constituent elements essential for solving the problem but also constituent elements not essential for solving the problem can be included in order to exemplify the above technique. Therefore, it should not be immediately recognized that these non-essential components are essential, even if those non-essential components are described in the accompanying drawings or the detailed description.

Further, because the above embodiments are for exemplifying the technique of the present disclosure, various changes, substitutions, additions, omissions, or the like can be made within the scope of the claims or the scope of equivalents thereof.

INDUSTRIAL APPLICABILITY

The optical unit of the present disclosure is applicable to, for example, a projection device using a TRP DMD.

The invention claimed is:

1. An optical unit comprising:
a first prism having a first coated surface configured to reflect illumination light in a first wavelength band, a first surface configured to transmit the illumination light to guide the illumination light to the first coated surface and configured to reflect the illumination light reflected by the first coated surface, and a first light transmitting surface configured to transmit the illumination light reflected by the first surface;
a second prism having a second coated surface configured to reflect the illumination light in a second wavelength band, a second surface configured to transmit the illumination light transmitted from the first coated surface to guide the illumination light to the second coated surface and configured to reflect the illumination light reflected by the second coated surface, and a second light transmitting surface configured to transmit the illumination light reflected by the second surface; and
a third prism having a third light transmitting surface configured to transmit the illumination light transmitted from the first and second coated surfaces, and a fourth light transmitting surface configured to transmit the illumination light transmitted from the third light transmitting surface,
wherein at least one of (i), (ii) is met:
  (i) the first prism is formed with normal lines of the first coated surface, the first surface, and the first light transmitting surface being out of coplanar with each other,
  (ii) the second prism is formed with normal lines of the second coated surface, the second surface, and the second light transmitting surface being out of coplanar with each other;
wherein
the first coated surface of the first prism and the second surface of the second prism are adjacent to each other, and
the first and third prisms are arranged with the first surface and the fourth light transmitting surface being parallel to each other.

2. The optical unit according to claim 1, further comprising a fourth prism adjacent to the first surface of the first prism, the fourth prism having a fifth light transmitting surface parallel to the fourth light transmitting surface,
wherein the first coated surface of the first prism and the second surface of the second prism are adjacent to each other.

3. The optical unit according to claim 1, further comprising a fourth prism disposed between the first prism and the second prism.

4. The optical unit according to claim 1, further comprising:
a first spatial light modulator arranged with the illumination light transmitted from the first light transmitting surface being incident thereon;
a second spatial light modulator arranged with the illumination light transmitted from the second light transmitting surface being incident thereon; and
a third spatial light modulator arranged with the illumination light transmitted from the fourth light transmitting surface being incident thereon.

5. The optical unit according to claim 4, wherein
each of the spatial light modulators is configured to generate a first modulated light based on the incident illumination light, and
the first to third prisms are arranged with at least one of the first coated surface and the second coated surface being out of orthogonal to an optical axis of the first modulated light on a plane including an optical axis of the illumination light incident on the third spatial light modulator and the optical axis of the first modulated light from the third spatial light modulator.

6. The optical unit according to claim 4, wherein the second spatial light modulator is arranged with a part of a second modulated light emitted from the second spatial light modulator being reflected by the second surface to be incident on the second coated surface, and with a rest of the second modulated light being incident on the second coated surface without passing through the second surface.

7. The optical unit according to claim 4, wherein the first spatial light modulator, the second spatial light modulator, and the third spatial light modulator are Tilt and Roll Pixel (TRP) digital micro mirror devices.

8. A projection device comprising:
the optical unit described in claim 4; and
a projection light source configured to supply illumination light to be incident on the optical unit.

9. An optical unit comprising:
a first prism having a first coated surface configured to reflect illumination light in a first wavelength band, a first surface configured to transmit the illumination light to guide the illumination light to the first coated surface and configured to reflect the illumination light reflected by the first coated surface, and a first light transmitting surface configured to transmit the illumination light reflected by the first surface;
a second prism having a second coated surface configured to reflect the illumination light in a second wavelength band, a second surface configured to transmit the illumination light transmitted from the first coated surface to guide the illumination light to the second coated surface and configured to reflect the illumination light reflected by the second coated surface, and a second light transmitting surface configured to transmit the illumination light reflected by the second surface;
a third prism having a third light transmitting surface configured to transmit the illumination light transmitted from the first and second coated surfaces, and a fourth light transmitting surface configured to transmit the illumination light transmitted from the third light transmitting surface; and
a fourth prism disposed between the first prism and the second prism,
wherein at least one of (i), (ii) is met:

(i) the first prism is formed with normal lines of the first coated surface, the first surface, and the first light transmitting surface being out of coplanar with each other, (ii) the second prism is formed with normal lines of the second coated surface, the second surface, and the second light transmitting surface being out of coplanar with each other.

10. An optical unit comprising:

a first prism having a first coated surface configured to reflect illumination light in a first wavelength band, a first surface configured to transmit the illumination light to guide the illumination light to the first coated surface and configured to reflect the illumination light reflected by the first coated surface, and a first light transmitting surface configured to transmit the illumination light reflected by the first surface;

a second prism having a second coated surface configured to reflect the illumination light in a second wavelength band, a second surface configured to transmit the illumination light transmitted from the first coated surface to guide the illumination light to the second coated surface and configured to reflect the illumination light reflected by the second coated surface, and a second light transmitting surface configured to transmit the illumination light reflected by the second surface;

a third prism having a third light transmitting surface configured to transmit the illumination light transmitted from the first and second coated surfaces, and a fourth light transmitting surface configured to transmit the illumination light transmitted from the third light transmitting surface;

a first spatial light modulator arranged with the illumination light transmitted from the first light transmitting surface being incident thereon;

a second spatial light modulator arranged with the illumination light transmitted from the second light transmitting surface being incident thereon; and a third spatial light modulator arranged with the illumination light transmitted from the fourth light transmitting surface being incident thereon, wherein at least one of (i), (ii) is met:

(i) the first prism is formed with normal lines of the first coated surface, the first surface, and the first light transmitting surface being out of coplanar with each other, (ii) the second prism is formed with normal lines of the second coated surface, the second surface, and the second light transmitting surface being out of coplanar with each other, wherein each of the spatial light modulators is configured to generate a first modulated light based on the incident illumination light, and the first to third prisms are arranged with at least one of the first coated surface and the second coated surface being out of orthogonal to an optical axis of the first modulated light on a plane including an optical axis of the illumination light incident on the third spatial light modulator and the optical axis of the first modulated light from the third spatial light modulator.

* * * * *